(12) United States Patent
Fu et al.

(10) Patent No.: US 11,304,274 B1
(45) Date of Patent: Apr. 12, 2022

(54) CAMERA WALL PLATE WITH SECURITY CAMERA

(71) Applicant: Kuna Systems Corporation, San Bruno, CA (US)

(72) Inventors: Sai-Wai Fu, Los Altos Hills, CA (US); Haomiao Huang, Redwood City, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 17/106,542

(22) Filed: Nov. 30, 2020

Related U.S. Application Data

(63) Continuation-in-part of application No. 16/585,342, filed on Sep. 27, 2019, now Pat. No. 10,887,958.

(Continued)

(51) Int. Cl.
*H05B 45/10* (2020.01)
*H04W 4/02* (2018.01)
(Continued)

(52) U.S. Cl.
CPC .............. *H05B 45/10* (2020.01); *F21S 8/033* (2013.01); *F21S 8/04* (2013.01); *G06V 40/67* (2022.01); *G08B 3/00* (2013.01); *G08B 13/196* (2013.01); *H04N 5/23229* (2013.01); *H04N 5/247* (2013.01); *H04N 7/18* (2013.01); *H04N 7/183* (2013.01); *H04W 4/02* (2013.01); *H05B 47/105* (2020.01); *H05B 47/16* (2020.01); *H05B 47/19* (2020.01); *F21W 2131/107* (2013.01);
(Continued)

(58) Field of Classification Search
CPC ...... H05B 45/10; H05B 47/105; H05B 47/16; H05B 47/19; F21S 8/033; F21S 8/04; G06K 9/00912; G06K 9/00288; G08B 3/00; G08B 13/196; H04N 5/23229; H04N 5/247; H04N 7/18; H04N 7/183; H04N 5/23219; H04W 4/02; F21W 2131/107; F21Y 2101/00
See application file for complete search history.

(56) References Cited

U.S. PATENT DOCUMENTS 10,326,921 B2 * 6/2019 Chien ................. H04N 5/23206
2003/0197807 A1 * 10/2003 Wu ....................... H04N 5/2256
348/375

(Continued)

*Primary Examiner* — Gevell V Selby
(74) *Attorney, Agent, or Firm* — Christopher P. Maiorana, PC

(57) ABSTRACT

An apparatus including a custom mounting bracket, an adapter plate and a base. The custom mounting bracket may comprise a first piece configured to be secured to an electrical junction box of a wall and a second piece comprising threaded pins. The adapter plate may comprise an interface configured to connect to an AC supply and enable a light fixture to be mounted to the custom mounting bracket and the adapter plate. The adapter plate may comprise a power adapter configured to provide the AC supply to the light fixture and convert the AC supply to a DC source. The base may comprise a circuit configured to receive the DC source and generate video data. The base may be configured to slide in and out of the adapter plate to adjust a distance between the adapter plate and the base.

20 Claims, 20 Drawing Sheets

Related U.S. Application Data which is a continuation-in-part of application No. 16/514,359, filed on Jul. 17, 2019, now abandoned, which is a continuation-in-part of application No. 16/252,841, filed on Jan. 21, 2019, now Pat. No. 10,555,393, which is a continuation of application No. 15/899,007, filed on Feb. 19, 2018, now Pat. No. 10,212,778, which is a continuation of application No. 15/611,975, filed on Jun. 2, 2017, now Pat. No. 10,117,309, which is a continuation of application No. 15/214,866, filed on Jul. 20, 2016, now Pat. No. 9,992,389.

(60) Provisional application No. 62/754,161, filed on Nov. 1, 2018, provisional application No. 62/700,452, filed on Jul. 19, 2018, provisional application No. 62/197,322, filed on Jul. 27, 2015.

(51) Int. Cl.
| | | |
|---|---|---|
| *F21S 8/04* | (2006.01) | |
| *H04N 7/18* | (2006.01) | |
| *G08B 3/00* | (2006.01) | |
| *H04N 5/232* | (2006.01) | |
| *G08B 13/196* | (2006.01) | |
| *H04N 5/247* | (2006.01) | |
| *H05B 47/16* | (2020.01) | |
| *H05B 47/19* | (2020.01) | |
| *H05B 47/105* | (2020.01) | |
| *F21S 8/00* | (2006.01) | |
| *G06V 40/60* | (2022.01) | |
| *F21W 131/107* | (2006.01) | |
| *F21Y 101/00* | (2016.01) | |
| *G06V 40/16* | (2022.01) | |

(52) U.S. Cl.
CPC ......... *F21Y 2101/00* (2013.01); *G06V 40/172* (2022.01); *H04N 5/23219* (2013.01)

(56) References Cited

U.S. PATENT DOCUMENTS

| | | | |
|---|---|---|---|
| 2018/0115131 A1* | 4/2018 | Kohen | H01R 13/625 |
| 2018/0249054 A1* | 8/2018 | Chien | H04N 5/2257 |
| 2020/0051412 A1* | 2/2020 | Swiss | F21V 33/0076 |

* cited by examiner

CAMERA WALL PLATE WITH SECURITY CAMERA

This application relates to U.S. Ser. No. 16/585,342, filed Sep. 27, 2019, which relates to U.S. Ser. No. 16/514,359, filed Jul. 17, 2019, which relates to U.S. Ser. No. 16/252,841, filed Jan. 21, 2019, which relates to U.S. Ser. No. 15/899,007, filed Feb. 19, 2018, now U.S. Pat. No. 10,212,778, which relates to U.S. Ser. No. 15/611,975, filed Jun. 2, 2017, now U.S. Pat. No. 10,117,309, which relates to U.S. Ser. No. 15/214,866, filed Jul. 20, 2016, now U.S. Pat. No. 9,992,389, which relates to U.S. Provisional Application No. 62/197,322, filed Jul. 27, 2015. U.S. Ser. No. 16/514,359, filed Jul. 17, 2019 also relates to U.S. Provisional Application No. 62/700,452, filed Jul. 19, 2018. This application also relates to U.S. Provisional Application No. 62/754,161, filed Nov. 1, 2018. Each of the mentioned applications are hereby incorporated by reference in their entirety.

FIELD OF THE INVENTION

The present invention relates to smart lighting generally and, more particularly, to a method and/or apparatus for implementing a camera wall plate with security camera.

BACKGROUND OF THE INVENTION

A new kind of smart security light has become available that lets users see and talk to a visitor at a door by using a cell phone anywhere that a cellular or Wi-Fi signal is available. A smart security light can be integrated with a new light fixture to replace an existing wall-mounted light fixture. New smart security lights provide an elegant solution for users who would like a new light fixture and like the designs offered.

There are at least two disadvantages of the current technology of replacing an existing light fixture with a new integrated smart security light. First, many users do not want to replace existing light fixtures. Second, some users prefer the design of other new light fixtures to the designs offered in the new smart security light integrated solutions.

It would be desirable to implement a camera wall plate with security camera.

SUMMARY OF THE INVENTION

The present invention concerns an apparatus including a custom mounting bracket, an adapter plate and a base. The custom mounting bracket may comprise a first piece configured to be secured to an electrical junction box of a wall and a second piece comprising threaded pins. The adapter plate may comprise an interface configured to connect to an AC supply and enable a light fixture to be mounted to the custom mounting bracket and the adapter plate. The adapter plate may comprise a power adapter configured to provide the AC supply to the light fixture and convert the AC supply to a DC source. The base may comprise a circuit configured to receive the DC source and generate video data. The base may be configured to slide in and out of the adapter plate to adjust a distance between the adapter plate and the base.

BRIEF DESCRIPTION OF THE DRAWINGS

Embodiments of the invention will be apparent from the following detailed description and the appended claims and drawings.

DETAILED DESCRIPTION OF THE PREFERRED EMBODIMENTS

Embodiments of the present invention include providing a camera wall plate with security camera that may (i) provide a retrofit for existing light fixtures, (ii) provide temporary installation for testing purposes, (iii) implement a custom mounting bracket, (iv) provide a wall-mount installation, (v) provide an electrical and mechanical interface for installing a light fixture, (vi) provide an adjustable mount to accommodate various light fixture lengths, (vii) provide a power adapter to supply both an AC and a DC power supply, (viii) provide a smart socket adapter with an integrated power adapter and/or (ix) be easy to implement.

Figure 1:
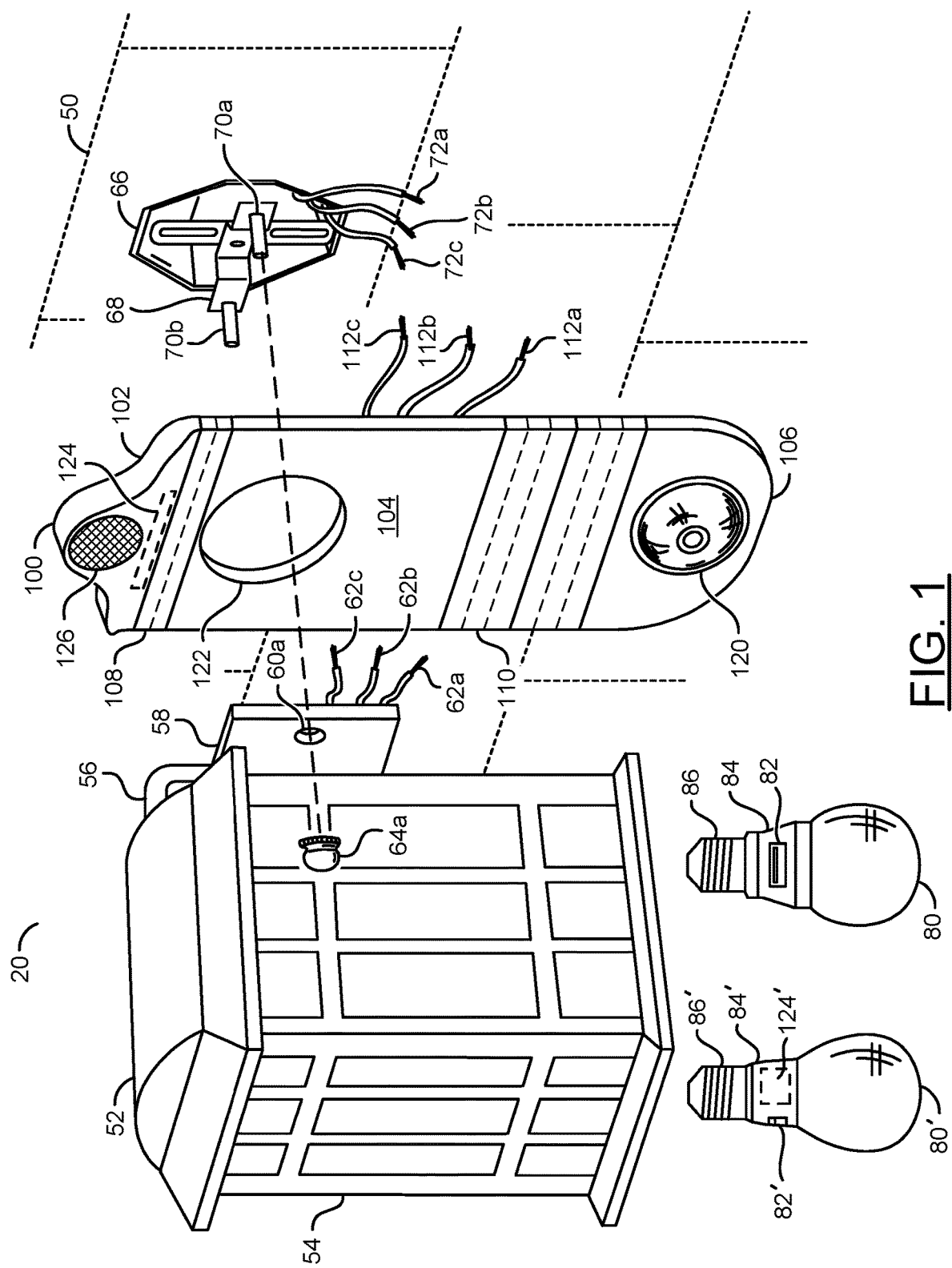
FIG. 1 is a diagram illustrating an apparatus mounting a light fixture to an electrical box.

Referring to FIG. 1, a diagram of an example installation 20 illustrating an apparatus 100 for mounting a light fixture 52 to an electrical box 66 is shown. The example installation 20 may comprise a wall 50, the light fixture 52, the apparatus 100 and the electrical box (e.g., junction box) 66. The junction box 66 may be located in the wall 50. The light fixture 52 may comprise a shade 54, a connector 56, a wall-mount plate 58, a mounting hole 60a, fixture wires 62a-62c, a locking nut 64a, and a light bulb 80. The junction box 66 may comprise a bracket 68, mounting screws 70a-70b and power supply wires 72a-72c.

The shade 54 of the light fixture 52 may be attached to the wall mounting plate 58 (e.g., connected by the connector 56). In one example, the wall plate 58 may be approximately 0.5 inches deep and the width may be 8 inches. The wall plate 58 may have the mounting holes 60a-60b to mount the light fixture 52 to the mounting bracket 68 of the junction box 66 using the mounting screws 70a-70b. The mounting screws 70a-70b may be covered by the decorative locking nuts 64a-64b.

The light bulb 80 may be installed in the light fixture 52. The light bulb 80 is shown having a port (or receptacle) 82. The port 82 may be implemented as a Universal Serial Bus (USB) port. The shade 54 may be implemented to diffuse light emitted by the light bulb 80 and/or protect the light bulb 80. The light emitted by the light bulb 80 may reflect off an interior of the shade 54 (e.g., scatter the emitted light causing one example of stray light). The shade 54 may be a diffusing medium. In an example, the shade 54 may be a glass material and/or a diffused plastic material. The shade 54 may be colored and/or clear. The implementation of the shade 54 may be varied according to the design criteria of a particular implementation.

The light bulb 80 may comprise a base 84 and a connector 86. The light bulb base 84 may comprise electronics for the light bulb 80. In some embodiments, the light bulb base 84 may comprise a heat sink. The connector 86 may be implemented to connect the light bulb 80 to a light bulb socket in the light fixture 52. For example, the connector 302 may be a standard screw-in base. The connector 86 may be a male connector for a female receptacle in the light fixture 52. The type of connector 86 implemented may be varied according to the design criteria of a particular implementation.

Fixture wires 62a-62c are shown extending from the wall plate 58. The fixture wires 62a-62c may be pre-existing connectors from the light fixture 52 (e.g., wires provided with the light fixture 52) used to connect a power supply to the light fixture 52 (e.g., provide power to the light bulb 80). In an example, the fixture wires 62a-62c may be housed within a channel of the connector 56 to connect a power source for a light socket to a power supply.

Portions of the apparatus 100 may be clamped between the wall plate 58 and the mounting bracket 68 through the action of the two mountings screws 70a-70b. The apparatus 100 may be configured to attach to the mounting bracket 68 of the junction box 66. The bracket 68 may be removably attached to the junction box 66. The bracket 68 may provide support for the light fixture 52 and/or the apparatus 100.

The mounting screws 70a-70b may be removably attached to the bracket 68. A length of extension of the mounting screws 70a-70b from the bracket 68 may be adjusted. For example, the length of extension of the mounting screws 70a-70b may be adjusted to accommodate wall mount bases having varying sizes and/or the depth of the apparatus 100. While two mounting screws 70a and 70b are shown, the particular number of mounting screws may be varied to meet the design criteria of a particular implementation. For example, a heavier fixture may need more screws. The mounting screws 70a-70b may be configured to support the light fixture 52 and/or the apparatus 100.

Power supply wires 72a-72c are shown extending from the junction box 66. The power supply wires 72a-72c may be pre-existing connectors to a power supply of the premises (e.g., standard household wiring) used to connect a power supply to various electrical devices. The power supply wires 72a-72c may provide power (e.g., an AC supply) to the apparatus 100 and/or the light fixture 52.

The apparatus 100 may comprise a top portion 102, a middle portion 104 and a bottom portion 106. The apparatus 100 may further comprise a top telescoping portion 108 and a bottom telescoping portion 110. The top telescoping portion 108 may be between the top portion 102 and the middle portion 104. The bottom telescoping portion 110 may be between the middle portion 104 and the bottom portion 106.

The apparatus 100 may comprise adapter wires 112a-112c, a lens module 120, an opening 122, a power adapter 124 and/or a speaker 126. In an example, the middle portion 104 may comprise the opening 122 and the adapter wires 112a-112c may extend from the middle portion 104. In another example, the bottom portion 106 may comprise the lens module 120 and the lens module 120 may be positioned below the shade 54 of the light fixture 52. In yet another example, the top portion 102 may comprise the power adapter 124 and the speaker 126. Each of the components may be implemented as a component of any of the top portion 102, the middle portion 104 and/or the bottom portion 106. The arrangement of the components of the apparatus 100 may be varied according to the design criteria of a particular implementation.

The apparatus 100 may be clamped between the light fixture wall mount plate 58 and the mounting bracket 68 through the action of the two mountings screws 70a-70b extending through the opening 122 and then through the mounting holes 60a-60b. The apparatus 100 may be configured to use the existing mounting bracket 68 inside the junction box 66 for support. The mounting screws 70a-70b may extend through the mounting holes 60a-60b. The locking nut 64a may removably attach to the mounting screw 70a to prevent the wall plate 58 from slipping off the mounting screw 70a. Similarly, a locking nut (e.g., a locking nut 64b, not shown) may removably attach to the mounting screw 70b. The locking caps 64a-64b may further provide a decorative function. The decorative function of the locking caps 64a-64b may be to hide the mounting screws 70a-70b from view.

The middle portion 104 may provide one or more channels for the adapter wires 112a-112c. The middle portion 104 may be as thin as possible to avoid a bulky look. In an example, the channel(s) may provide a path from the power adapter 124 to a backside of the apparatus 100. The adapter wires 112a-112c may connect to the fixture wires 62a-62c and/or the power supply wires 72a-72c. The power adapter 124 may be configured to connect to a source providing AC power (e.g., the power supply wires 72a-72c). The power supply wires 72a-72c may be used to provide AC power (e.g., high voltage) to/from the power adapter 124.

The power adapter 124 may use the adapter wires 112a-112c to transmit AC power between the power source wires 72a-72c (e.g., from the electrical box 66) and the light fixture wires 62a-62c). For example, the wires 72a-72c may provide a hot, neutral, return, ground, etc. The adapter wires 112a-112c may connect to the fixture wires 62a-62c to provide power to the light bulb 80 and/or control signals for the light bulb 80 (e.g., to control powering on/off the light bulb 80, to adjust a dimming of the light bulb 80, to adjust a color of the light bulb 80, etc.). The connections between the fixture wires 62a-62c, the power supply wires 72a-72c and/or the adapter wires 112a-112c may be varied according to the design criteria of a particular implementation.

In some embodiments, the power adapter 124 is shown implemented inside a top portion 102 (e.g., a decorative enclosure) of the apparatus 100. In an example, the power adapter 124 may be 50 mm×30 mm×30 mm. The top portion 102 may further comprise the speaker 126. The speaker 126 may be powered by the power adapter 124.

In some embodiments, the light bulb 80' may be implemented. The light bulb 80' may comprise the power adapter 124'. The power adapter 124' located in a light bulb base 84' may be implemented instead of the power adapter 124 in the top portion 102 of the apparatus 100. The light bulb 80' may receive an AC power supply from a conventional light socket inside the light fixture 52 (e.g., via an electrical connection from the fixture wires 62a-62c that may connect to the power supply wires 72a-72c). The power adapter 124' may convert the AC power supply to a DC power supply. The power adapter 124' may provide a DC power supply output to the port 82'. In an example, a USB connector may connect to the port 82' to provide DC power to an external device. In one example, the port 82' may be used to provide DC power to the lens module 120.

The light bulb 80' may comprise the smart socket adapter 84' and the connector 86'. In some embodiments, the smart socket adapter 84' may contain the power adapter 124' and/or electronics for the light bulb 80'. In some embodiments, the smart socket adapter 84' may comprise the power adapter 124' and the light bulb 80' may screw into the smart socket adapter 84'.

The apparatus 100 may provide an easy way to install an Internet-connected security camera and a 2-way intercom to a standard light fixture (e.g., the light fixture 52). The light fixture 52 may be wall-mounted or ceiling-mounted. The apparatus 100 may comprise the AC power adapter 124, the Internet-connected security camera module 120 and/or a thin plate adapter (e.g., the middle portion 104). Optionally, the apparatus 100 may comprise the speaker 126. The speaker 126 may implement a 2-way intercom (e.g., the speaker 126 may comprise a speaker and a microphone). The plate adapter 104 may fit between the standard light fixture 52 and the wall 50 (or the ceiling). The components of the apparatus 100 (e.g., the AC power adapter 124, the camera module 120 and/or the plate adapter 104) may be integrated into one single piece for many wall-mounted light fixtures, or may be separated into 2 or more components (e.g., the top portion 102, the middle portion 104 and the bottom portion 106).

The apparatus 100 may implement the adapter plate 104 as one unit and/or as separate components. The apparatus 100 may sit between the standard light fixture 52 (wall mounted or ceiling mounted) and the electrical junction box 66 in the wall (or the ceiling) 50. Where the components and/or electronics of the apparatus 100 (e.g., the AC power adapter 124, the speaker(s) 126, the Internet-connected camera module 120, etc.) are placed may be varied according to the design criteria of a particular implementation.

The apparatus 100 may be an aesthetically pleasing way to implement a security camera with various light fixture styles. By breaking the apparatus 100 up into 3 components (e.g., the power adapter 124, the camera module 120 and/or the plate adapter 104) the apparatus 100 may enable the functionality of a security camera and be installed with a light fixture that is already owned and/or installed (e.g., retrofit).

Figure 2:
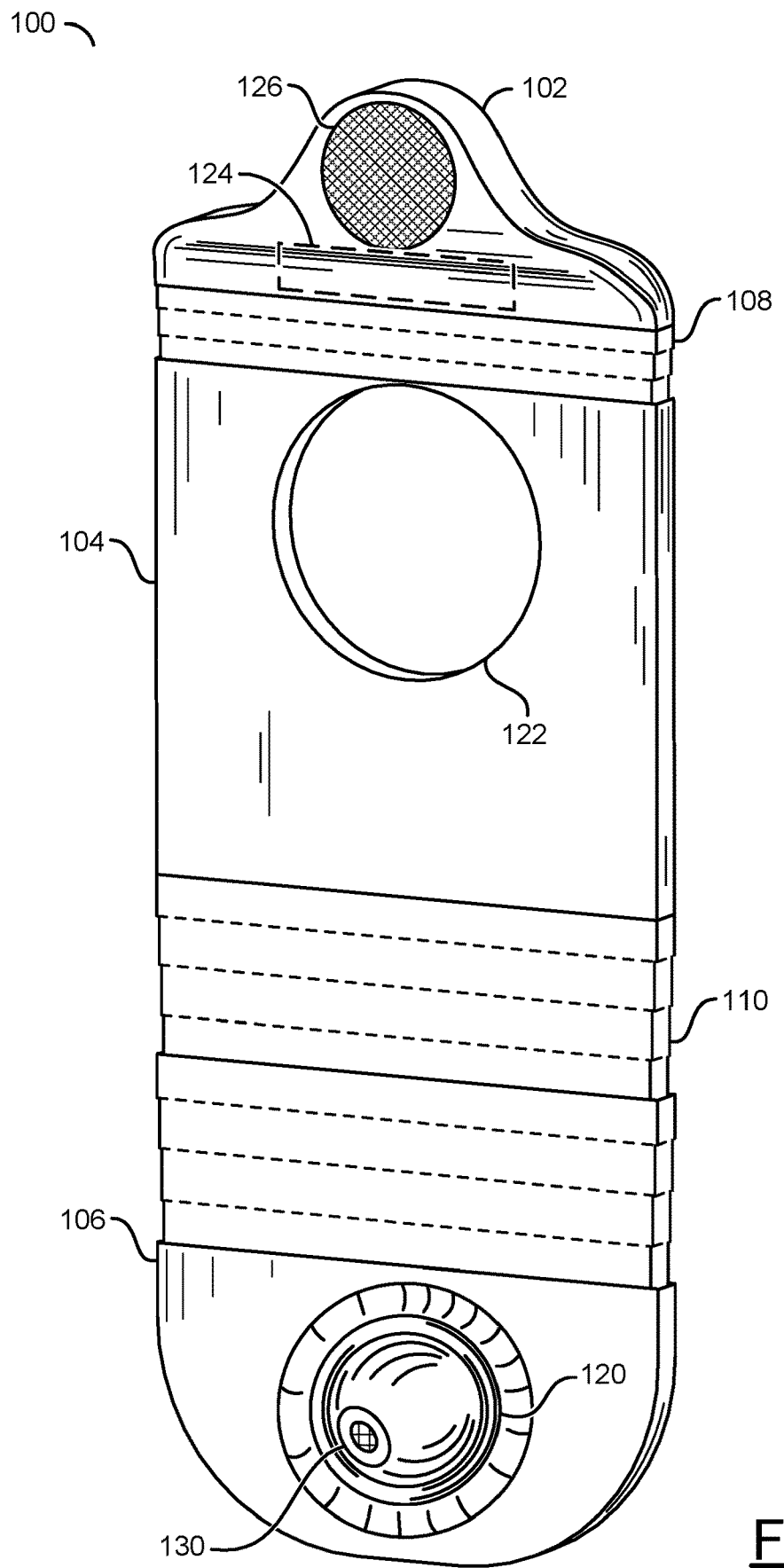
FIG. 2 is a diagram illustrating an example embodiment of the apparatus with an extended base.

Referring to FIG. 2, an example embodiment of the apparatus 100 with an extended base is shown. The top portion 102 is shown comprising the power adapter 124 and the speaker 126. Other components may be implemented in the top portion 102. In some embodiments, the top portion 102 may be 1 inch deep. The speaker 126 may be 2 inches in diameter. The top portion 102 may be designed to provide a decorative function.

The top telescoping portion 108 is shown partially extended. The top telescoping portion 108 may extend to create a distance between the top portion 102 and the middle portion 104. In the example shown, the top telescoping portion 108 may be extended further or may be closed to abut the middle portion 104. For example, the top telescoping portion 108 may be adjustable from 0 to 3 inches. The top telescoping portion 108 may comprise a number of segments configured to nest within a next segment to implement the telescoping function. Other telescoping methods may be implemented. In an example, the top telescoping portion 108 may comprise slider bracket and/or a guide to adjust the length of the top telescoping portion 108.

The middle portion 104 may be 0.5 inches deep. The depth of the middle portion 104 may be a small size to ensure that the mounting screws 70a-70b extend through the opening 122 and through the fixture wall-plate 58. In one example, the middle portion 104 may have a smaller depth than the top portion 102 and/or the bottom portion 106. The depth of the middle portion 104 may be designed such that when the fixture base 58 is clamped to the middle portion 104, the fixture wall-late 58 fits flush against the top portion 102 and/or the bottom portion 106. The dimensions of the middle portion 104 may be varied according to the design criteria of a particular implementation.

The opening 122 implemented in the middle portion 104 may be approximately the same size (e.g., 4 inches in diameter) of a standard junction box (e.g., the junction box 66 shown in FIG. 1). The opening 122 may be used for mounting the light fixture 52. For example, the light fixture 52 may be mounted to the plate adapter 104 using the light fixture wall-mount plate 58 and the mounting screws 70a-70b from the junction box 66 (e.g., the apparatus 100 may be clamped between the junction box 66 and the light fixture plate 58).

The bottom telescoping portion 110 is shown fully extended. The bottom telescoping portion 110 may extend to create a distance between the middle portion 104 and the bottom portion 106. In the example shown, the top telescoping portion 108 may be collapsed to decrease the distance between the middle portion 104 and the bottom portion 106 or may be closed to abut the middle portion 104 against the bottom portion 106. For example, the bottom telescoping portion 110 may be adjustable from 0 to 6 inches. The bottom telescoping portion 110 may comprise a number of segments configured to nest within a next segment to implement the telescoping function. Other telescoping methods may be implemented. In an example, the bottom telescoping portion 110 may comprise slider bracket and/or a guide to adjust the length of the bottom telescoping portion 110.

The bottom portion 106 is shown comprising the lens module 120. A lens 130 is shown on the lens module 130. The bottom portion 106 may be 0.5 inches deep. The camera module 120 may extend from approximately 1.5 inches from the bottom portion 106. The camera module 120 may be implemented as a rotatable ball with a diameter of approximately 2 inches (e.g., 0.5 inches within the bottom portion 106 and 1.5 inches extending from the bottom portion 106). The dimensions of various components of the apparatus 100 may be varied according to the design criteria of a particular implementation.

Figure 3:
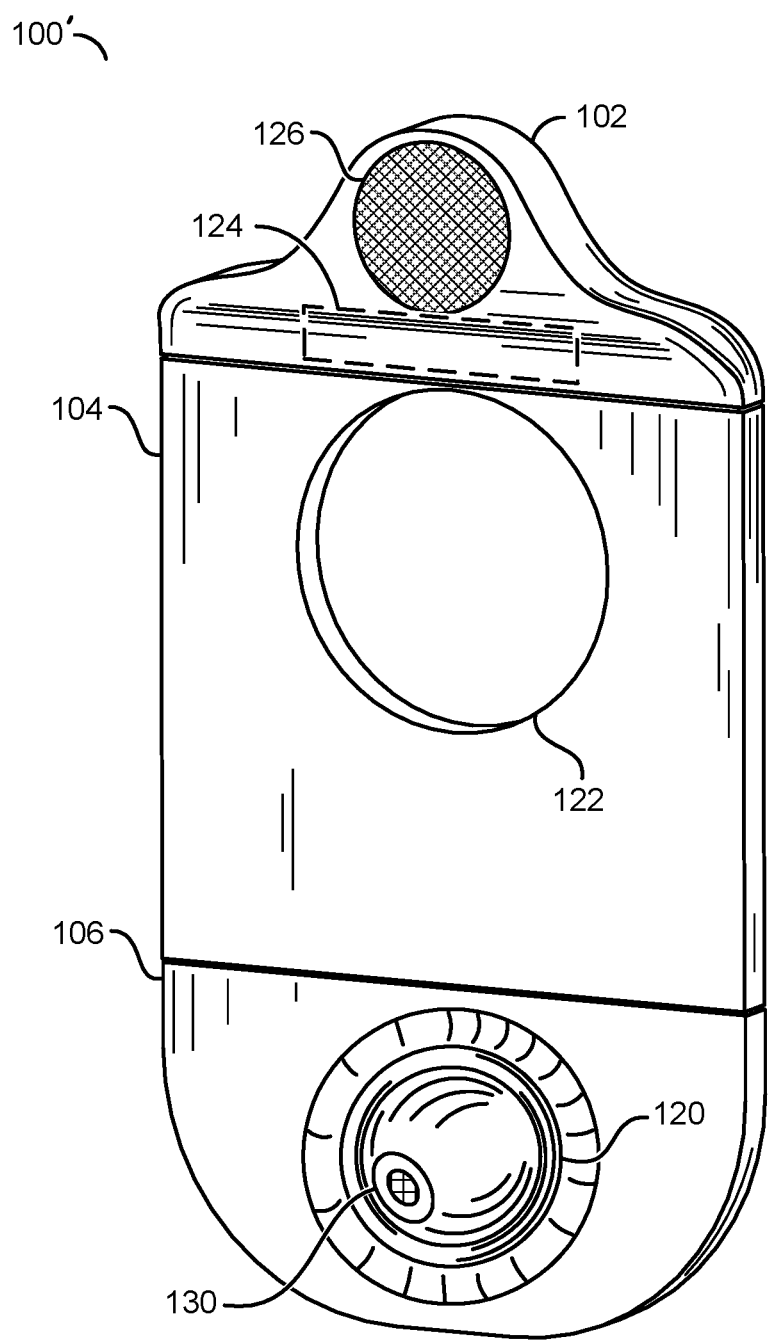
FIG. 3 is a diagram illustrating an example embodiment of the apparatus with a retracted base.

Referring to FIG. 3, an example embodiment of the apparatus 100' with a retracted base is shown. The top telescoping portion 108 may be fully retracted (e.g., not visible). The bottom telescoping portion 110 may be fully retracted (e.g., not visible).

Retracting the top telescoping portion 108 and the bottom telescoping portion 110 may reduce a length of the apparatus 100 to a minimum length. When the top telescoping portion 108 is fully retracted, the top portion 102 may be adjacent to the middle portion 104. When the bottom telescoping portion 110 is fully retracted, the middle portion 104 may be adjacent to the bottom portion 106.

The middle portion 104 may be designed to have a small depth. To reduce the depth of the middle portion 104, the telescoping mechanisms (e.g., the telescoping segments, the brackets, the sliders, etc.) may collapse into the top portion 102 and/or the bottom portion 106. The top portion 102 and/or the bottom portion 106 may have a larger depth than the middle portion 104 to accommodate the telescoping mechanisms. In an example, the telescoping segments of the top telescoping portion 108 may collapse into the top portion 102 when the top telescoping portion 108 is fully retracted. Similarly, the telescoping segments of the bottom telescoping portion 110 may collapse into the bottom portion 106 when the bottom telescoping portion 108 is fully retracted. The telescoping portions may collapse into the top and/or bottom portions to keep the middle portion 104 thin.

The camera module 120 may be embedded in the bottom portion 106 of the apparatus 100. To capture images and/or video of an environment near the apparatus 100, the camera lens 130 has to have a field of view unobstructed by the light fixture 52 (e.g., for a light fixture that hangs down, the camera module 120 should be located below the shade 54). In embodiments where the shade 54 does not obstruct the field of view of the lens 130, the bottom portion 106 may be retracted as shown in FIG. 3. In embodiments where the shade does obstruct the field of view of the lens 130, the bottom telescoping portion 110 may be extended, as shown in FIG. 2, to move the lens module 120 below the shade 54 to provide the lens 130 with an unobstructed field of view.

Various combinations of the placement of the speaker 126 and/or the power adapter 124 may be implemented. The power adapter 124, the speaker 126 and/or other components of the apparatus 100 may be anywhere on the wallplate apparatus 100 with minimal impact on performance. In one example, the speaker 126 may be placed on the bottom portion 106 to reduce a distance between the microphone and a person speaking when the light fixture 52 is located above a person. Different placements of the components of the apparatus 100 may have very different aesthetics appeal. The placement of the camera module 120 may impact performance. Generally, the camera module 120 may be placed to have a clear field of view. The location of the components of the apparatus 100 may be varied according to the design criteria of a particular implementation. For example, the power adapter 124 may be in the top portion 102, in the bottom portion 106 and/or next to the electrical junction box 66. In some embodiments, the power adapter 124 may be in the base of the light fixture (e.g., the wall-mount plate 58) and/or the base of a light bulb 80' (as shown in FIG. 1). In another example, the speaker 126 may be on the top portion 102 and/or on the bottom portion 106.

Figure 4:
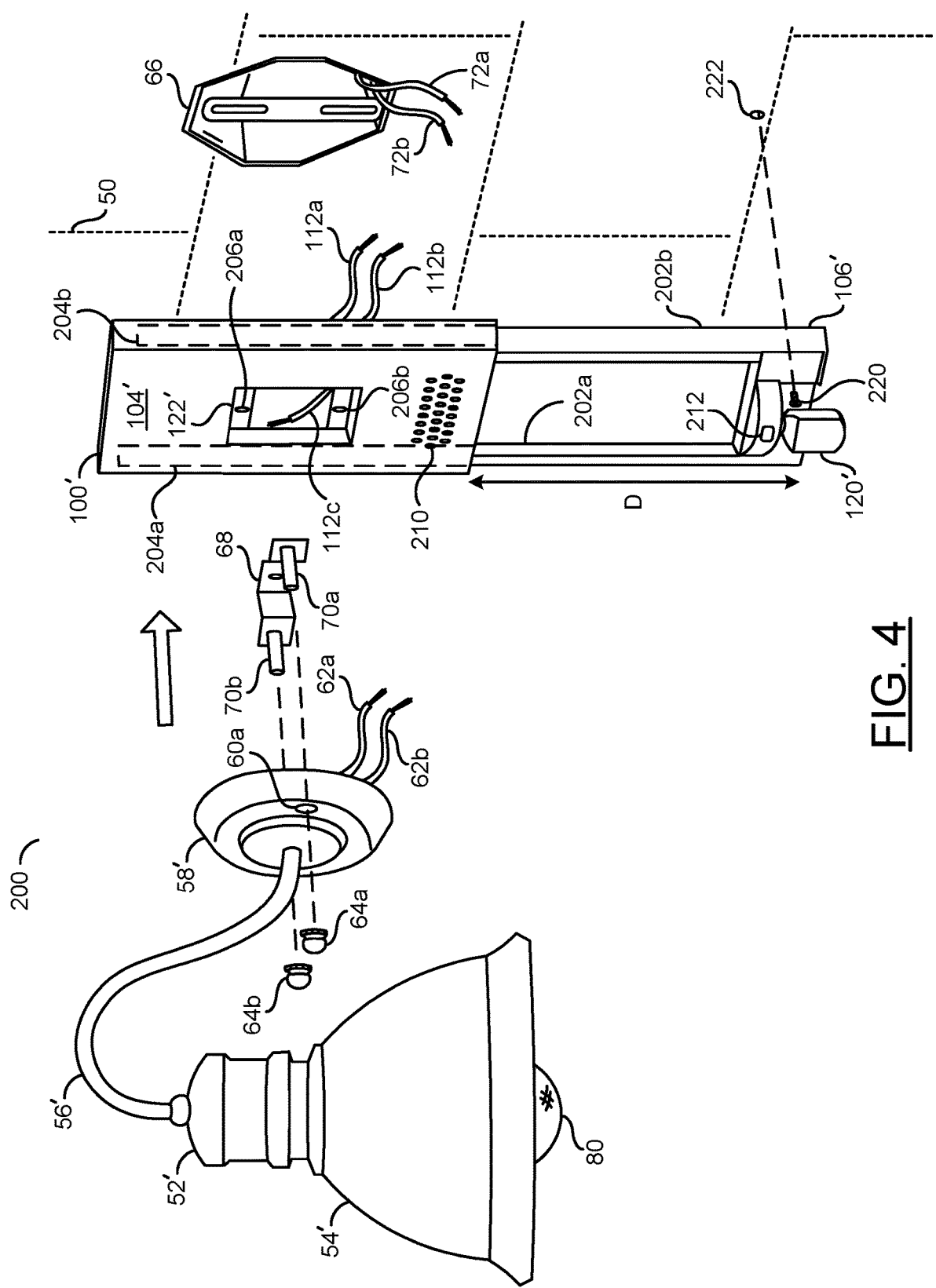
FIG. 4 is a diagram illustrating an example embodiment of a camera wall plate.

Referring to FIG. 4, a diagram illustrating an example embodiment of a camera wall plate is shown. An exploded view 200 is shown. The exploded view 200 may comprise the wall 50, the light fixture 52', the junction box 66, the mounting bracket 68, and the camera wall plate adapter 100'. Similar to the example shown in FIG. 1, the light fixture 52' may comprise the lamp shade 54', the connector 56' and the light fixture mounting plate 58'. The light bulb 80 is shown installed in the lamp shade 54'. The mounting hole 60a is shown on the light fixture mounting plate 58'. The fixture wires 62a-62b are shown extending from the light fixture mounting plate 58'. The locking caps 64a-64b may be used to secure the light fixture mounting plate 58' to the mounting bracket 68 when the mounting screws 70a-70b are inserted through the mounting holes 60a-60b. The mounting bracket 68 may enable the light fixture 52' to be secured to the junction box 66 and the camera wall plate adapter 100'. In an example, the camera wall plate adapter 100' may be installed in between the junction box 66 and the light fixture 52'.

The camera wall plate adapter 100' may comprise the adapter plate 104' and the base 106'. Extendable arms 202a-202b are shown between the adapter plate 104' and the base 106'. The extendable arms 202a-202b may be configured to enable the distance between the adapter plate 104' and the base 106' to be adjusted. In some embodiments, the extendable arms 202a-202b may be configured to slide into the adapter plate 104'. In some embodiments, the extendable arms 202a-202b may be configured to slide into the base 106'. In some embodiments, the extendable arms 202a-202b may be collapsible (or telescoping) similar to the top telescoping portion 108 and/or the bottom telescoping portion 110 described in association with FIGS. 1-3. In the example exploded view 200, two of the collapsible arms 202a-202b are shown. In some embodiments, one extendable arm may be implemented between the adapter plate 104' and the base 106'. In some embodiments, more than two of the extendable arms 202a-202b may be implemented. The design of the extendable arms 202a-202b may be varied according to the design criteria of a particular implementation.

The adapter plate 104' may comprise the adapter wires 112a-112c, the interface 122', channels 204a-204b, mounting holes 206a-206b and a speaker grille 210. The base 106' may comprise the camera module 120', a passive infrared (PIR) sensor 212 and a set screw 220. The adapter plate 104' and/or the base 106' may comprise more components than shown in the example exploded view 200. The number, type and/or arrangement of the components of the adapter plate 104' and/or the base 106' may be varied according to the design criteria of a particular implementation.

The adapter plate 104' may be configured to enable the light fixture 52' to be mounted to the wall 50. The adapter plate 104' may be located (e.g., clamped) between the wall 50 and the light fixture 52' (e.g., secured using the light fixture mounting plate 58'). The adapter plate may provide the interface 122'. The interface 122' may be configured to enable a mechanical connection and an electrical connection. In an example, the electrical connection may be implemented using the adapter wires 112a-112c. The electrical connection may be between a power supply provided via the junction box 66, the camera wall plate 100' and the light fixture 52'. In an example, the mechanical connection may be between the wall 50 (or the junction box 66), the camera wall plate 100' and the light fixture 52'. The mechanical connection may enable the light fixture 52' to be attached to a front side of the adapter plate 104'. The interface 122' may comprise one or more openings (e.g., the mounting holes 206a-206b) for fasteners (e.g., openings for screws). For example, cross bars (to be described in association with FIGS. 9-10) may be secured to the interface 122' to enable a mechanical connection between the adapter plate 104' and the light fixture 52'. When the light fixture 52' is installed, the light fixture mounting plate 58' may cover the interface 122'.

The interface 122' may comprise the adapter wires 112a-112c. The adapter wires 112a-112c may be color coded according to local rules/codes/regulations. In an example, the interface 122' may comprise 3 wires 112a-112c. The neutral (return) wire 112a from the interface 122' may be tied together using a wire nut with the neutral wire 72a from the junction box 66 and the neutral wire 62a from the light sconce 52'. The hot wire (AC power) 112b from the interface 122' may be tied together using a wire nut with the hot wire 72b from the junction box 66 to provide a constant AC power to the power adapter 124 (not shown) in the adapter plate 104'. The interface 122' may comprise a controlled hot (AC) wire 112c that may be tied together using a wire nut with the hot (AC) wire 62b from the light sconce 52'. Then the power adapter 124 of the camera wall plate 100' may provide control (e.g., controlled AC power) to turn the light 80 on/off.

The base 106' may comprise the camera module 120'. The camera module 120' may be configured to capture video data. The base may comprise internal circuitry (to be described in association with FIG. 6). The circuitry may enable the functionality of the camera wall plate 100' (e.g., video capture, wireless communication, facial recognition, motion detection, two-way audio, etc.).

The adapter plate 104' may comprise the hollow channels 204a-204b to enable the extendable arms 202a-202b to slide into and out of the adapter plate 104'. Sliding the extendable arms 202a-202b into and out of the hollow channels 204a-204b may cause the distance between the adapter plate 104' and the base 106' to adjust. Sliding the extendable arms 202a-202b into the hollow channels 204a-204b may retract the base 106' (e.g., shorten the distance between the adapter plate 104' and the camera module 120'). Sliding the extendable arms 202a-202b out of the adapter plate 104' may extend the base 106' (e.g., lengthen the distance between the adapter plate 104' and the camera module 120').

The base 106' may comprise one or more screws at the bottom. In the example exploded view 200, the single set screw 220 is shown on the base 106'. The set screw 220 may be configured to secure the base 106' to the wall 50 (e.g., to maintain the desired distance between the camera module 120' and the adapter plate 104'). A screw hole 222 is shown on the wall 50. The screw hole 222 may be created by the installer at a location where the installer desires the base 106' to be extended to. The set screw 220 may be inserted through the base 106' and into the screw hole 222 to secure the base 106' to the wall 50 at the desired distance from the adapter plate 104'. Securing the set screw 220 may be one method of locking the amount of extension of the extendable arms 202a-202b. In the example shown, the set screw 220 is located behind the camera module 120' and the set screw 220 may be accessible when the camera module 120' is tilted to the side and/or forwards/upwards.

A distance (e.g., D) is shown. The distance D may be a distance between the adapter plate 104' and the camera module 120'. Adjusting the moving the extendable arms 202a-202b may adjust the distance D. For example, sliding the extendable arms 202a-202b into the adapter plate 104' may decrease the distance D. The distance D may be reduced until the base 106' abuts the adapter plate 104'. In another example, sliding the extendable arms 202a-202b out from the adapter plate 104' may increase the distance D. The distance D may extend to a length based on the size of the arms 202a-202b.

Figure 5:
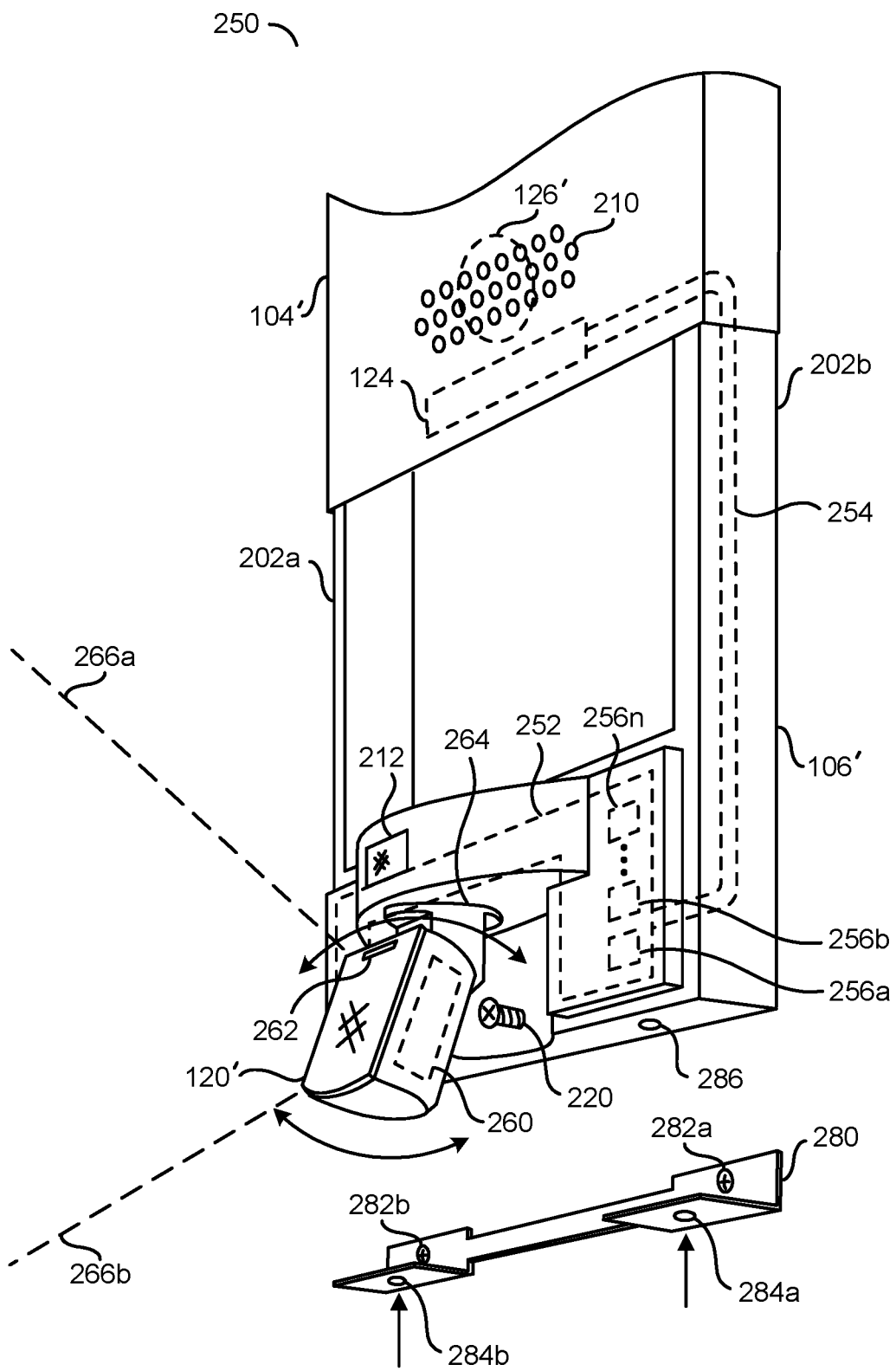
FIG. 5 is a diagram illustrating a base of a camera wall plate.

Referring to FIG. 5, a diagram illustrating the base 106' of the camera wall plate 100' is shown. An example view 250 may show a portion of the adapter plate 104' and the base 106'. The extendable arms 202a-202b are shown connecting the adapter plate 104' to the base 106'.

The speaker 126' is shown within the adapter plate 104'. The speaker grille 210 is shown on the housing of the adapter plate 104' in front of the speaker 126'. In an example, the housing may be a plastic material. In another example, the housing may be weatherproof. The speaker grille 210 may provide openings to enable the speaker 126' to emit sound while still providing protection from the elements to the speaker 126' and/or other components within the adapter plate 104'.

The power adapter 124 is shown within the adapter plate 104'. The power adapter 124 may be configured to convert the AC power supply (e.g., provided from the power supply wires 72a-72b of the junction box 66) to a DC power (e.g., 5V DC). The converted DC power may be used by the various components of the camera wall plate 100'.

A circuit board 252 is shown within the base 106'. The circuit board 252 may enable various functionality of the camera wall plate 100' (to be described in association with FIG. 6). A connection 254 is shown from the power adapter 124 down one of the arms (e.g., the extendable arm 202b) to the circuit board 252 within the base 106'. The connection 254 may transmit the DC power from the power adapter to the circuit board 252. In the example shown, the connection 254 is within the extendable arm 202b. In another example, the connection 254 may be implemented within the extendable arm 202a. In yet another example, the connection 254 may be implemented in both of the extendable arms 202a-202b.

The circuit board 252 may comprise blocks (or circuits) 256a-256n. The circuits 256a-256n may be various modules configured to perform the functionality of the camera wall plate 100' (e.g., generate video data, analyze video data, Wi-Fi, Bluetooth, might vision, PIR, alerts/notifications, facial recognition, object detection, motion detection, conversational artificial intelligence, package detection, theft prevention, two-way audio communication, etc.). The DC power provided from the connection 254 may enable the modules 256a-256n to operate.

The camera module 120' and the PIR sensor 212 are shown on the base 106'. The camera module 120' may comprise a block (or circuit) 260. The circuit 260 may comprise a camera (or image) sensor. A microphone 262 is shown on the camera module 120'. The camera module 120' may be configured to capture image data using the camera sensor 260 and audio data using the microphone 262.

A hinge 264 is shown. The hinge 264 may connect the camera module 120' to the base 106'. The camera module 120' may be configured to swivel to the left or right. The camera module 120' may be configured to tilt up or down. The hinge 264 on the base 106' may enable the tilting/swiveling. For example, the hinge 264 may rotate left/right with respect to the base 106' to swivel the camera module 120'. In another example, the hinge 264 may bend up/down at the camera module 120' to tilt the camera module 120' up/down.

Dotted lines 266a-266b are shown extending from the camera module 120'. The dotted lines 266a-266b may represent a field of view of the camera module 120'. The size and/or shape of the field of view 266a-266b may depend on the type of camera sensor 260 implemented and/or lens implemented (e.g., a wide angle lens). Tilting or swiveling the camera module 120' using the hinge 264 may adjust the field of view 266a-266b.

In an example, the camera module 120' may be configured to tilt up to 40 degrees. Tilting the camera module 120' up (e.g., an acute angle between the base 106' and the camera module 120') may enable the adapter plate 104' to be implemented with the base 106' located above the adapter plate 104'. For example, the adapter plate 104' may be rotated 180 degrees (e.g., opposite to the example shown in FIG. 5). When the base 106' is mounted upside down, tilting the camera module 120' "up" (e.g., at an acute angle) would result in a downward angle for the field of view 266a-266b. In an example, the camera module 102' may be mounted about 6 feet high and the field of view 266a-266b may be configured to capture a view of the ground as well as in front of the camera wall plate 100'.

A secure bracket 280 is shown. The secure bracket 280 may be located under the base 106'. The secure bracket 280 may comprise an L shape (e.g., two portions/sections connected at a right angle). The secure bracket 280 may comprise wall screws 282a-282b. The wall screws 282a-282b may securely attach the secure bracket 280 to the wall 50. For example, one edge of the L shape of the secure bracket 280 with the wall screws 282a-282b may be connected flat against the wall 50.

The secure bracket 280 may comprise locking screws holes 284a-248b. The locking screw holes 284a-284b may be implemented on the other edge of the L shape of the secure bracket 280 from the edge with the wall screws 282a-282b. Screws may be inserted upwards (e.g., from the bottom) of the secure bracket 280 through the locking screw holes 284a-284b. The screws inserted through the screw holes 284a-284b (not shown) may be connected to a bottom of the base 106'.

An opening 286a is shown on the bottom of the base 106' (e.g., paired with another opening 286b, which may be hidden from view by the camera module 120' in the example view 250). The screws inserted through the screw holes 284a-284b may be inserted in the corresponding openings 286a-286b to secure the base 106' to the secure bracket 280.

In an example, when installing the camera wall plate 100', the installer may adjust the extendable arms 202a-202b to a desired level (e.g., for an unobstructed view for the field of view 266a-266b). The installer may create a mark on the wall 50 at the lower edge of the base 106'. The installer may slide the extendable arms 202a-202b up to provide space to mount the secure bracket 280 to the wall 50. The installer may align the secure bracket 280 to the mark made on the wall 50 to mount the secure bracket 280 to the wall 50 at the desired/measured location. Once the secure bracket 280 is installed using the wall screws 282a-282b, the installer may extend the extendable arms 202a-202b down to the level of the secure bracket 280. The screws may be inserted through the screw holes 284a-284b from underneath into the corresponding openings 286a-286b to attach the base 106' to the secure bracket 280. Attaching the base 106' to the secure bracket 280 may ensure that the base 106' (and the camera module 120') remain at the desired level so that there is an unobstructed field of view 266a-266b.

Figure 6:
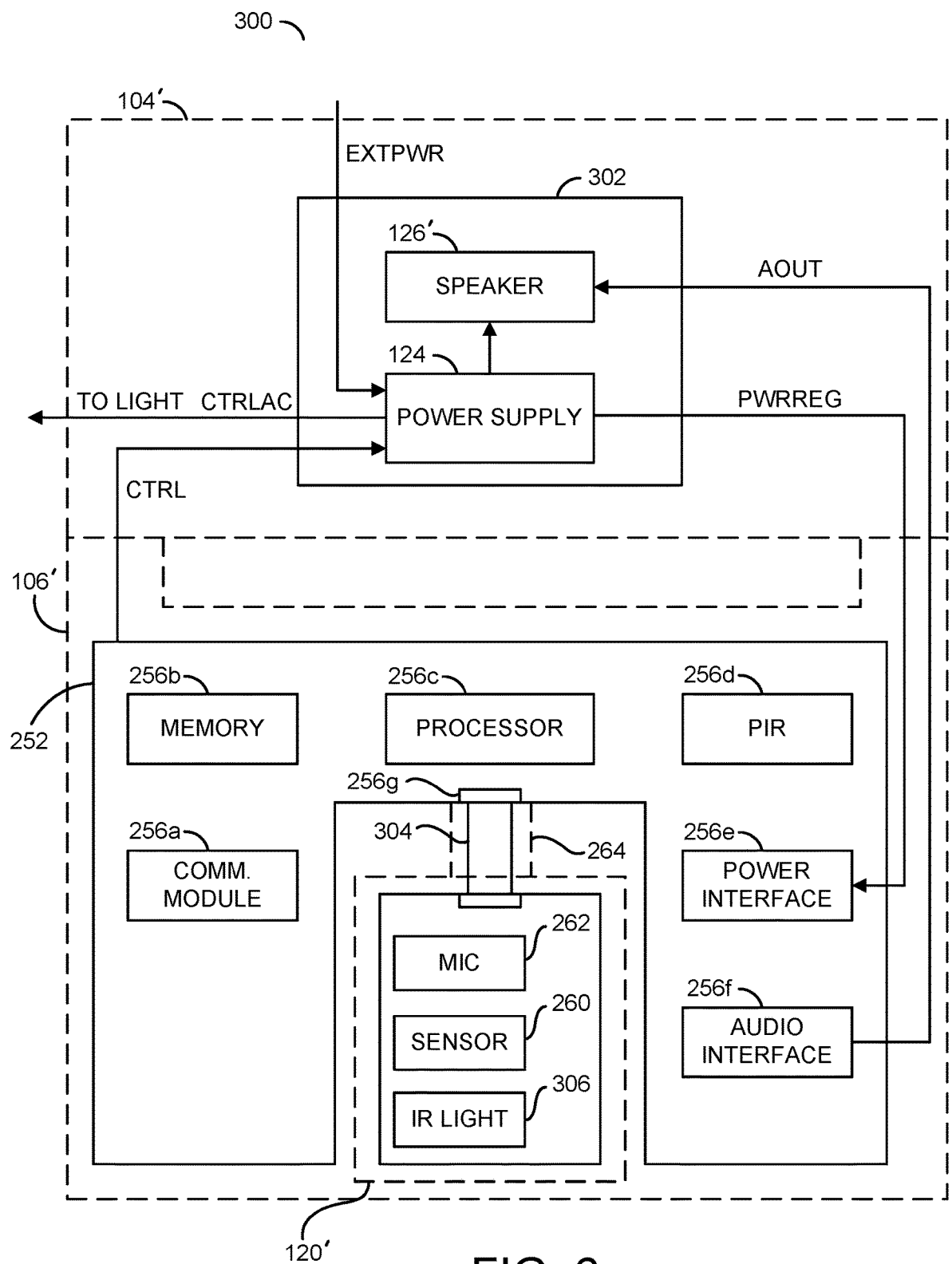
FIG. 6 is a block diagram illustrating example components of a camera wall plate.

Referring to FIG. 6, a block diagram illustrating example components of the camera wall plate 100' is shown. A block diagram 300 is shown comprising the adapter plate 104', the base 106' and/or the camera module 120'. The adapter plate 104' may comprise a block (or circuit) 302. The circuit 302 may comprise the speaker 126' and/or the power supply 124. The circuit 302 may receive a signal (e.g., EXTPWR), a signal (e.g., CTRL) and/or a signal (e.g., AOUT). The circuit 302 may present a signal (e.g., CTRLAC) and/or a signal (e.g., PWRREG). The number, type and/or function of signals generated by and/or received from the circuit 302 may be varied according to the design criteria of a particular implementation.

The signal EXTPWR may provide the AC power to the power adapter 124. In an example, the signal EXTPWR may be presented by the power supply wires 72a-72b and received at the interface 122' using the adapter wires 112a-112c. The signal EXTPWR may be received by the power adaptor 124.

The signal CTRLAC may provide controlled AC power to the light sconce 52. The controlled AC power CTRLAC may enable the camera wall plate 100' to control the light bulb 80 in the light sconce 52. In an example, the signal CTRLAC may be a passthrough of the signal EXTPWR. The signal CTRLAC may be transmitted from one of the adapter wires 112a-112c to the fixture wires 62a-62b.

The signal CTRL may be received by the power adapter 124. The signal CTRL may be generated by the circuit 252. The signal CTRL may provide feedback to enable the signal CTRLAC (e.g., enable the passthrough of the signal EXTPWR). For example, the signal CTRL may enable the circuit 252 to control the power adapter 124 (e.g., control the generation of the signal CTRLAC) that controls the status of the light 80. For example, the user may provide an instruction from a smartphone app that is configured to function with the circuit 252 (e.g., a companion app) and the circuit 252 may communicate the signal CTRL to the power adapter 124 to enable the control of the light bulb 80 using the signal CTRLAC. The signal CTRL may be transmitted using the connector 254.

The power adapter 124 may provide the signal PWRREG to the circuit 252. For example, the signal PWRREG may be a regulated DC voltage. The power adapter 124 may be able to convert the AC power from the signal EXTPWR to a DC power supply. The DC power supply may be presented as the signal PWRREG. The signal PWRREG may be transmitted using the connection 254.

The signal AOUT may be received by the speaker 126'. The signal AOUT may be received from the circuit 252. The signal AOUT may be an audio signal. The speaker 126' may output audible sounds in response to the signal AOUT. The signal AOUT may be transmitted using the connection 254.

The base 106' may comprise the circuit 252. The circuit 252 may comprise the components 256a-256g. The component 256a may implement a wireless communication module. The component 256b may implement a memory. The component 256c may implement a processor. The component 256d may implement a PIR sensor. The component 256e may implement a power interface. The component 256f may implement an audio interface. The component 256g may implement a data interface. In the example 300, components 256a-256g may be implemented. The circuit 252 may implement additional functionality (e.g., the components 256a-256n). The number, type and/or arrangement of the components 256a-256n may be varied according to the design criteria of a particular implementation. The communication module 256a may be configured to perform wireless communication. For example, the communication module 256a may be configured to receive instructions from the companion app and/or provide output to the companion app. For example, the processor 256c may generate a notification that a visitor has been detected, and the communication module 256a may communicate the notification as a message on the companion app. The communication module 256a may implement a Wi-Fi communication protocol, a Bluetooth communication protocol and/or any other (or combination of other) wireless communication protocols.

The memory 256b may be configured to store computer readable instructions. The memory 256b may be configured to store data (e.g., recorded video data, audio to output via the speaker 126', data received via the communication module 256a, etc.). The processor 256c may be configured to execute the computer readable instructions, process input, perform comparisons, make decisions, generate output, etc. The processor 256c may be configured to analyze and/or encode video data.

The PIR sensor 256d may be configured to detect motion. The PIR sensor 256d may be an implementation of the PIR sensor 212 shown in association with FIG. 4. In an example, the PIR sensor 256 may provide input to the processor 256c when motion is detected. The processor 256c may interpret the sensor input (e.g., compare an amount of motion detected by the PIR sensor 256d to a threshold amount of motion) and determine whether to activate the light 80 in response to the motion. The processor 256c may generate the signal CTRL to communicate to the power adapter 124 to activate the light 80 (e.g., by causing the power adapter 124 to generate the signal CTRLAC).

The power interface 256e may be configured to receive the DC voltage from the power adapter 124. For example, the power interface 256e may be an input for the DC power for the circuit 252. The circuit 252 may deliver the DC power from the power interface 256e to the various components 256a-256n.

The audio interface 256f may be configured to provide the signal AOUT. The signal AOUT may be an audio output for the speaker 126'. In an example, the processor 256c may select an audio output. The memory 256b may store the selected audio output. The memory 256b may present the selected audio output to the audio interface 256f. The audio interface 256f may convert the stored audio data to a format playable by the speaker 126'. In an example, the audio interface 256f may implement a digital to analog converter.

The data interface 256g may be configured to send/receive data to/from the camera module 120'. The data interface 256g may be a high speed data bus. The data interface 256g may be configured to receive the video data captured by the camera module 120'.

The hinge 264 is shown between the base 106' and the camera module 120'. A cable 304 is shown within the hinge 264. The cable 304 may be configured to communicate data between the camera module 120' and the data interface 256g. The cable 304 may be a high speed data cable capable of streaming video data (e.g., a high-speed, low-latency ribbon cable for communicating high resolution video frames). In an example, the cable 304 may be a flexible ribbon cable configured to bend and/or twist as the hinge 264 is rotated and/or the camera module 120' is tilted.

The camera module 120' may comprise the camera sensor 260, the microphone 262, and/or a block (or circuit) 306. The circuit 306 may implement an IR light. The camera module 120' may comprise other components (not shown). The number, type and/or arrangement of the components of the camera module 120' may be varied according to the design criteria of a particular implementation.

The image sensor 260 may be configured to convert input (e.g., light) into digital information. The digital information generated by the image sensor 260 may be presented to the processor 256c (via the cable 304 and the data interface 256g). The processor 256c may generate video frames in response to the digital information captured by the image sensor 260.

The microphone 262 may be configured to receive input audio. In an example, the audio interface 256f may be configured to convert the analog audio input captured by the microphone 262 into digital data. The IR light 306 may be configured to emit IR light. The IR light 306 may enable the capture of data in low light conditions.

The processor 256c may be configured to generate video data from the video frames. In some embodiments, the processor 256c may be configured to perform object detection/recognition. In some embodiments, the communications module 256a may communicate the video data to a remote computing service (e.g., cloud processing services) that may perform object detection/recognitions and communicate the results of the object detection back to the communication module 256a. The processor 256c may be configured to generate the signal CTRL in response to the video data (e.g., the results of the object detection). For example, the signal CTRL may be generated when a visitor is detected to control the light 80. In another example, the processor 256c may generate the signal CTRL to generate other types of actions in response to the results of the object detection (e.g., an alarm, providing a notification to a companion app, contact authorities, upload recorded video data, etc.). In some embodiments, a smartphone may implement a companion app that enables a user to remotely provide input to the circuit 252. For example, the user may use the companion app on the smartphone to control a status of the light 80. The smartphone may transmit the input from the user to the communication module 256a. The processor 256c may interpret the input from the user and generate the signal CTRL to control (e.g., to control the status of the light 80).

Figure 7:
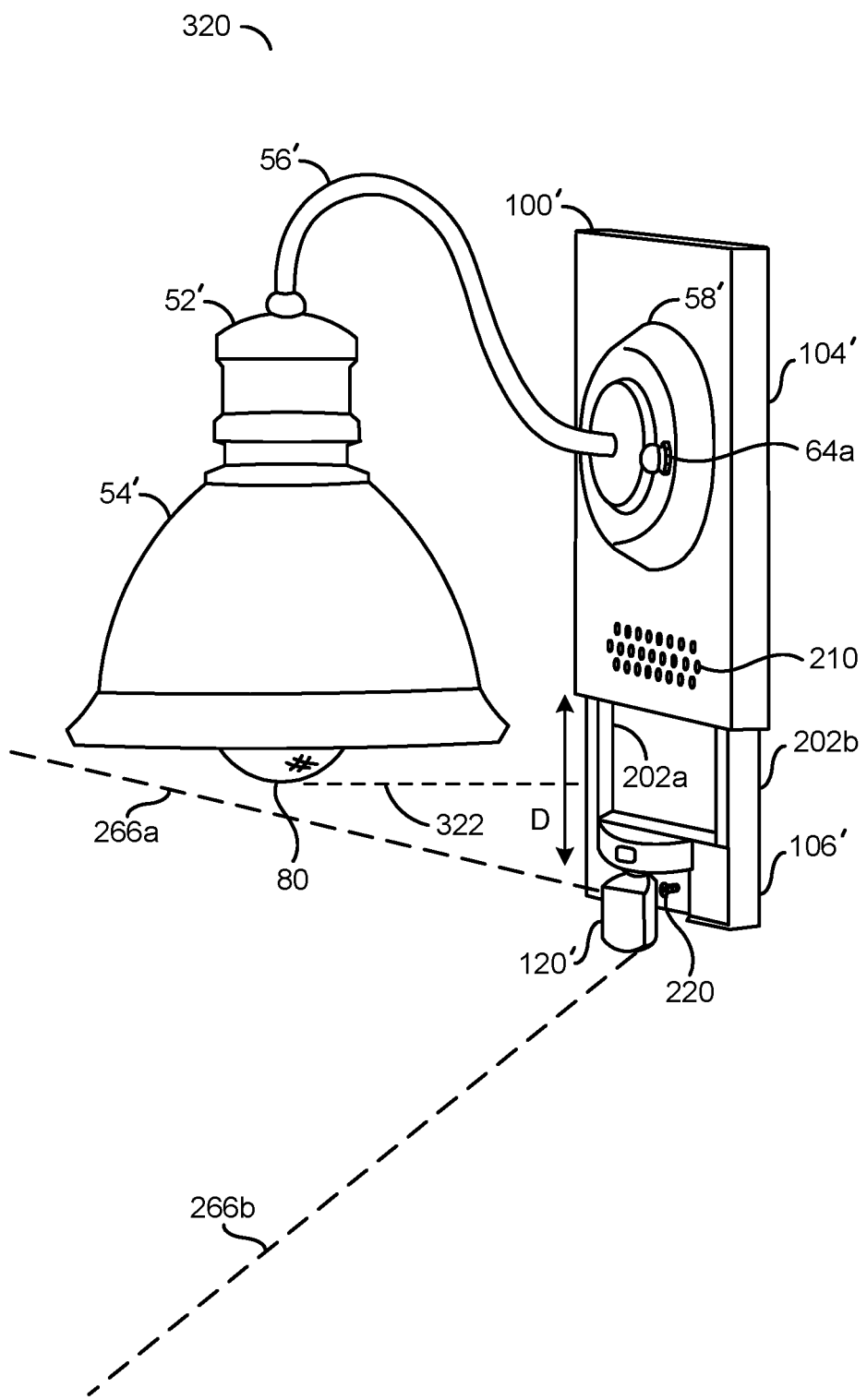
FIG. 7 is a diagram illustrating a field of view of a camera module that has been adjusted to below a level of a light fixture.

Referring to FIG. 7, a diagram illustrating a field of view of a camera module that has been adjusted to below a level of a light fixture is shown. An example drop-down installation configuration 320 is shown. The example drop-down installation configuration 320 may comprise the light fixture 52' connected to the camera wall plate 100'. The light bulb 80 is shown installed within the light shade 54'. The light shade 54' is connected to the light fixture mounting plate 58' with the light fixture connector 56'. The light fixture mounting plate 58' may be securely connected to the adapter plate 104' using the mounting cap 64a (and 64b, not shown). The light fixture mounting plate 58' may be covering the interface 122'.

The camera wall plate 100' is shown. The base 106' and the camera module 120' are shown oriented below the adapter plate 104'. The camera wall plate 100' may be in the drop-down configuration when the base 106' and/or the camera module 120' are oriented below the adapter plate 104'. The speaker grille 210 is shown on the adapter plate 104'. The extendable arms 202a-202b are shown extending from the adapter plate 104'. The set screw 220 is shown on the base 106'.

A dotted line 322 is shown. The dotted line 322 may represent a level below the light sconce 54'. In the example shown, the level 322 may correspond to the light bulb 80 that is shown hanging out from the lamp shade 54'. The distance D is shown. The extendable arms 202a-202b are shown extended so that the distance D is large enough that the camera module 120' is below the level 322. The field of view 266a-266b is shown. The field of view 266a-266b may not be obstructed by the lamp shade 54' and/or the light bulb 80.

The distance D may be adjusted such that the field of view 266a-266b may not be obstructed by the light fixture 52'. In the example shown, the distance D may be large enough for the camera module 120' to be below the level 322. If the distance D is made too short (e.g., above the level 322), the field of view 266a-266b may be obstructed by the light fixture 52'. Enabling the base 106' and/or the camera module 120' to be moved downwards may enable a homeowner to keep an existing light fixture and/or use the apparatus 100' with a desired style of light fixture. The distance D may be adjusted to ensure that the field of view 266a-266b is not obstructed to accommodate various shapes and sizes of light fixtures. For example, the functionality of the camera module 120' and/or the components 256a-256n may not be limited due to the light fixture 52'.

The light sconce 54' is shown as a downward hanging light sconce. The base 106' is shown extended so that the camera is located below the level 322 (e.g., the bottom of the light sconce 54'). When the camera module 120' is below the level 322 of the light sconce 54', the field of view 266a-266b may not be obstructed by the light sconce 54' and/or the light bulb 80 (or any other decorative feature of the light fixture 52'). Adjusting the length of the extension arms 202a-202b to change the distance D of the base 106' may enable the camera module 120' to capture unobstructed video and be compatible with many different styles of light sconces.

The base 106' may be connected to the adapter plate 104' by the arms 202a-202b. The arms 202a-202b may be hollow to enable wiring (e.g., the connector 254) for connecting the circuit 252 to the power adapter 124. The arms 202a-202b may extend from the adapter plate 104'. The arms 202a-202b may be fully retracted and the top of the base 106' may fit against the bottom of the adapter plate 104' (e.g., the distance D may be equal to zero). In one example, the arms 202a-202b may extend from the adapter plate 104' approximately 6 to 12 inches. The distance D of the arms 202a-202b may be set to any distance between the closed (e.g., fully retracted) state and the fully extended state. The amount of extension (e.g., the selected distance) may be locked by using the screws 220 in the base 106'.

Figure 8:
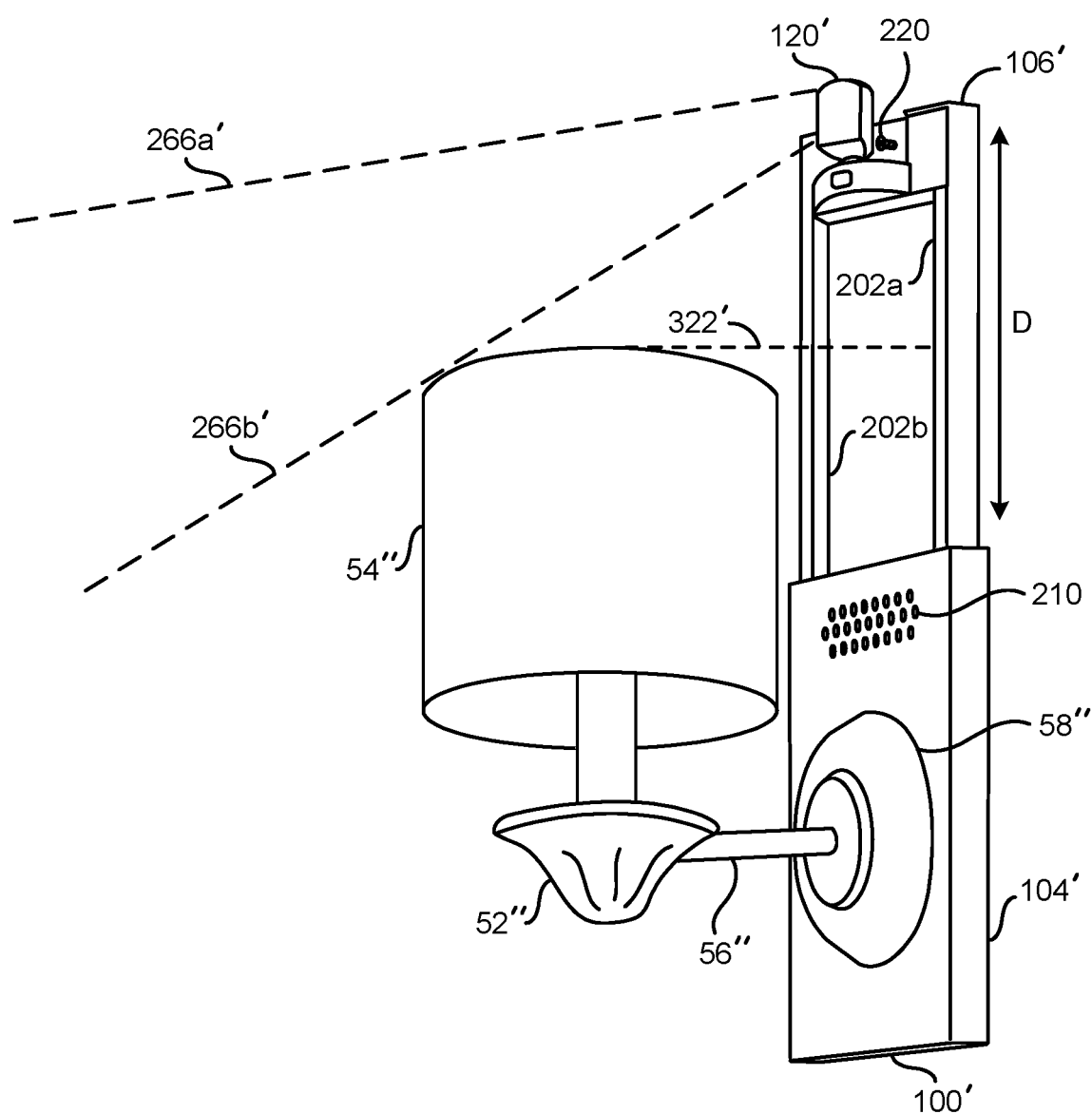
FIG. 8 is a diagram illustrating a field of view of a camera module that has been adjusted to above a level of a light fixture.

Referring to FIG. 8, a diagram illustrating a field of view of a camera module that has been adjusted to above a level of a light fixture is shown. An example upright installation configuration 340 is shown. The example upright installation configuration 340 may comprise the light fixture 52" connected to the camera wall plate 100'. The light shade 54" is connected to the light fixture mounting plate 58" with the light fixture connector 56". The light fixture mounting plate 58" may be securely connected to the adapter plate 104' using the mounting caps 64a-64b (not shown). The light fixture mounting plate 58" may be covering the interface 122'.

The camera wall plate 100' is shown. The base 106' and the camera module 120' are shown oriented above the adapter plate 104'. The camera wall plate 100' may be in the upright configuration when the base 106' and/or the camera module 120' are oriented above the adapter plate 104'. The speaker grille 210 is shown on the adapter plate 104'. The extendable arms 202a-202b are shown extending from the adapter plate 104'. The set screw 220 is shown on the base 220.

The dotted line 322' is shown. The dotted line 322' may represent a level above the light sconce 54". In the example shown, the level 322' may correspond to the top of the lamp shade 54". The distance D is shown. The extendable arms 202a-202b are shown extended so that the distance D is large enough that the camera module 120' is above the level 322'. The field of view 266a'-266b' is shown. The field of view 266a'-266b' may not be obstructed by the lamp shade 54", the light bulb 80 and/or other decorative features of the light fixture 52".

The distance D may be adjusted such that the field of view 266a'-266b' may not be obstructed by the light fixture 52" (e.g., the top of the lamp shade 54"). In the example shown, the distance D may be large enough for the camera module 120" to be above the level 322'. If the distance D is made too short (e.g., below the level 322'), the field of view 266a'-266b' may be obstructed by the light fixture 52". Enabling the base 106' and/or the camera module 120' to be moved upwards may enable a homeowner to keep an existing light fixture and/or use the apparatus 100' with a desired style of light fixture. The distance D may be adjusted to ensure that the field of view 266a'-266b' is not obstructed to accommodate various shapes and sizes of light fixtures. For example, the functionality of the camera module 120' and/or the components 256a-256n may not be limited due to the light fixture 52".

The light sconce 52" is shown as an upward light sconce. The camera wall plate 100' may be rotated 180 degrees (from the drop-down configuration) so that the base 106' is above the adapter plate 104'. The base 106' may be extended above the lamp shade 54". The base 106' may be extended so that the level 322' of the top of the upward lamp shade 54" is below the camera module 120'. The field of view 266a'-266b' is shown extending from above the top of the light sconce 52" and unobstructed by the top of the light sconce 52". The field of view 266a'-266b' may be angled downwards. The tilt of the camera module 120' may enable the field of view 266a'-266b' to be angled downwards without being obstructed by the top of the light sconce 52".

In the example shown, the distance D may be adjusted to enable the camera module 120' to be located a large distance from the level 322'. For example, the distance D in the example upright installation configuration 340 may be larger than the distance D in the example drop-down installation configuration 320 shown in association with FIG. 7. Generally, the camera module 120' may be tilted downwards. For example, light fixtures are generally located higher up on a premises and visitors may be below the light fixtures. In order to capture the visitors in the video data, the desired location of the field of view 266a'-266b' may be below the light fixture 52". In the upright orientation, the field of view 266a'-266b' may be configured to be unobstructed by the lamp shade 54" but still provide a view of the ground area below the light fixture 52". Increasing the distance D for the upright configuration may enable the field of view 266a'-266b' to be unobstructed, but still provide a perspective that captures the desired area of interest below the light fixture 52".

Figure 9:
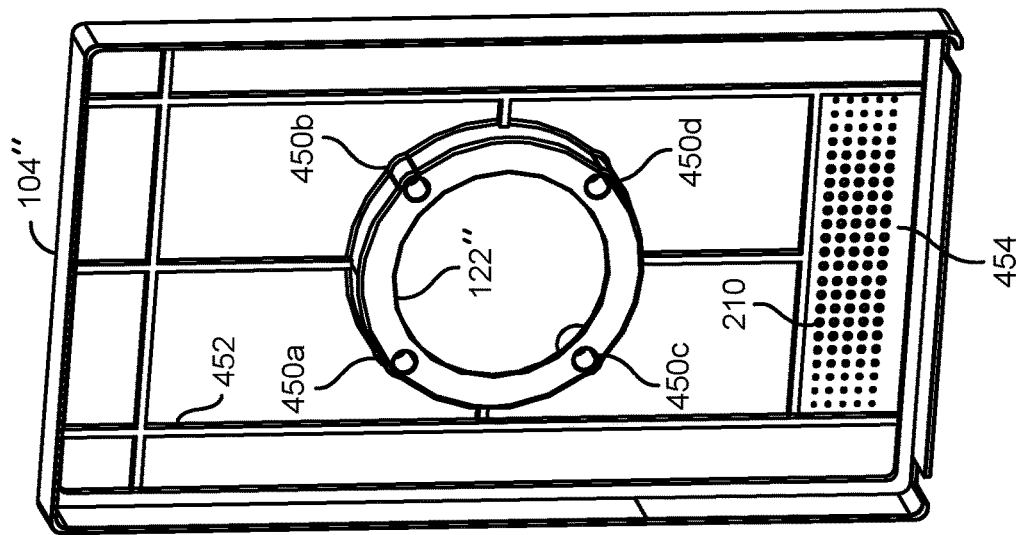
FIG. 9 is a diagram illustrating a custom mounting bracket installation and a back side of a camera wall plate.
Figure 9:
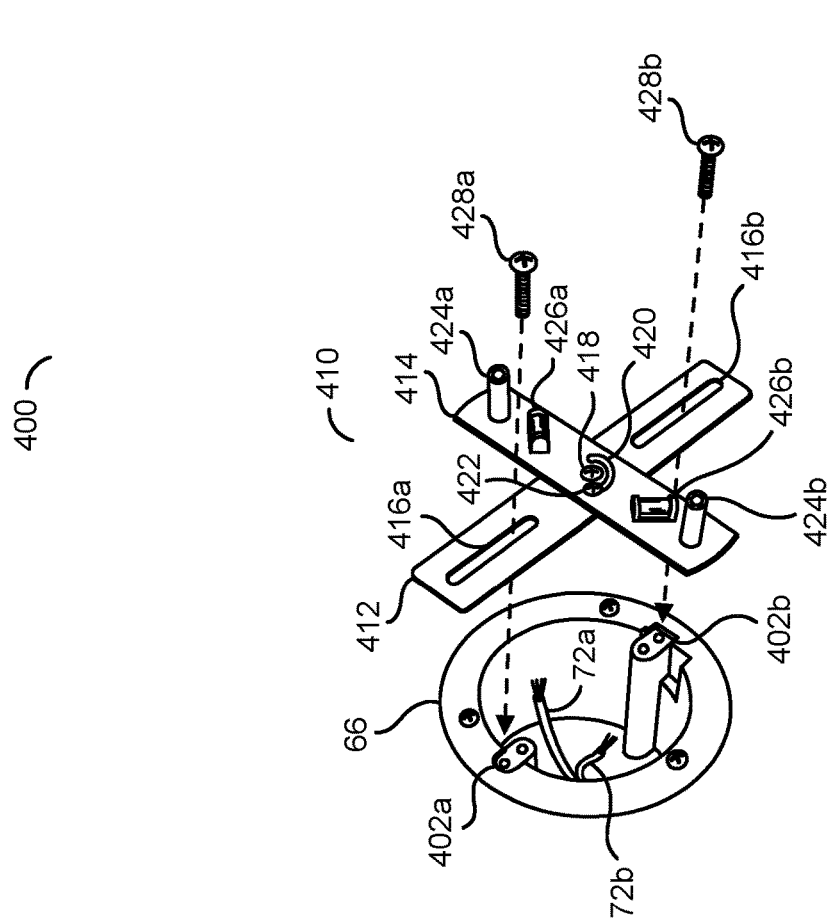

Referring to FIG. 9, an exploded diagram illustrating an example embodiment of the present invention is shown. An exploded view 400 of a custom mounting bracket is shown. The exploded view 400 may also comprise a back view of the adapter plate 104". The adapter plate 104" is shown without the base 106' and/or the extendable arms 202a-202b attached.

The junction box 66 is shown with the power supply wires 72a-72b. Junction screw holes 402a-402b are shown. The junction screw holes 402a-402b may be configured to accept screws to secure a custom mounting bracket 410 to the junction box 66.

The custom mounting bracket 410 is shown. The custom mounting bracket 410 may comprise two components (e.g., a first piece 412 and a second piece 414). The first piece 412 and the second piece 414 may be adjustably secured to each other through the middle (e.g., to enable the first piece 412 and the second piece 414 to form an X shape at various angles).

The first piece 412 may comprise slots 416a-416b. The slots 416a-416b may be on opposite ends of the first piece 412. The slots 416a-416b may enable a screw to pass through the first piece 412. The slots 416a-416b may enable the first piece 412 to align with the screw holes 402a-402b of the junction box 66. The slots 416a-416b may be wide enough for the threaded portion of the screws to pass through but narrow enough to enable the head of the screw to hold the first piece 412 in place against the junction box 66. In an example, the first piece 412 may be approximately 6 inches long.

The second piece 414 may comprise a center screw 418, a circular slot 420, a slide screw 422, threaded pins 424a-424b and bubble levels 426a-426b. The center screw 418 may secure the first piece 412 to the second piece 414. The slide screw 422 may slide throughout the circular slot 420 (e.g., having a semi-circle shape) to change the angle between the first piece 412 and the second piece 414 of the custom mounting bracket 410. For example, the center screw 418, the circular slot 420 and the slide screw 422 may enable the second piece 414 to rotate with respect to the first piece 412 (e.g., rotate about a cental point where the center screw 418 is located). When the installer moves the set slider screw 422 to achieve the desired angle (e.g., to align the slots 416a-416b to the screw holes 402a-402b), the slider screw 422 and/or the center screw 418 may be tightened to secure the first piece 412 and the second piece 414 together while preserving the selected angle. In the example shown, the second piece 414 has a flat implementation. In some embodiments, the second piece 414 may be modified (e.g., have a bent shape) to enable clearance for a ground screw.

The threaded pins 424a-424b may be configured to align with the interface 122" of the adapter plate 104". The threaded pins 424a-424b may be threaded on the inside to connect to a crossbar that may be provided with the light fixture 52. In an example, the threaded pins 424a-424b may be approximately 3.5 inches apart.

The bubble level 426a may be a horizontal bubble level. The bubble level 426b may be a vertical bubble level. The bubble levels 426a-426b may be implemented to provide the installer with a quick guide to ensure that the second piece 414 is positioned correctly. For example, the second piece 414 may be set at a 45 degree angle for correct installation (e.g., to align with the interface 122"). For example, when the bubble level 426a indicates a horizontal level within the indicated tolerance, then the second piece 414 may be aligned with the interface 122" (e.g., at a 45 degree angle) in a first orientation. In another example, when and the bubble level 426b indicates a horizontal level within the indicated tolerance, then the second piece 414 may be aligned with the interface 122" (e.g., at a 45 degree angle) in a second orientation (e.g., rotated in an orientation opposite to the first orientation shown in the exploded view 400).

Junction box screws 428a-428b are shown in the exploded view 400. The junction box screws 428a-428b may be configured to be inserted through the slots 416a-416b of the first piece 412 and then into the junction screw holes 402a-402b. The junction box screws 428a-428b may be configured to secure (e.g., mechanically connect) the custom mounting bracket 410 to the junction box 66. The junction box screws 428a-428b may be inserted anywhere along a respective one of the slots 416a-416b in order to align with the junction screw holes 402a-402b.

Forming the X shape between the first piece 412 and the second piece 414 at various angles may enable the custom mounting bracket 410 to be installed in various designs of junction boxes (e.g., with the junction screw holes 402a-402b in a 3.125 inch junction box, a 3.5 inch junction box, a 4.125 inch junction box and/or a 4.375 inch junction box). To accommodate the different sizes of junction boxes, the junction box screws 428a-428b may be inserted through the slots 416a-416b at different distances. The bubble levels 426a-426b may enable the installer to ensure that the threaded pins 424a-424b are level regardless of the orientation of the first piece 412.

A rear view of the adapter plate 104" and the interface 122" is shown. The interface 122" may comprise mounting holes 450a-450d. When the second piece 414 of the custom mounting bracket 410 is properly aligned (e.g., according to the bubble levels 426a-426b), the threaded pins 424a-424b may be configured to align with two or more of the mounting holes 450a-450d. In an example, the ends of the threaded pins 424a-424b may be rounded to provide an easier insertion of the threaded pins 424a-424b into the mounting holes 450a-450d. In an example, the adapter plate 104" may removably attach to the custom mounting bracket 410 by inserting the threaded pins 424a-424b into at least two of the mounting holes 450a-450d. The threaded pins 424a-424b may enable the custom mounting bracket 410 to mechanically attach to the interface 122'. The threaded opening of the threaded pins 424a-424b may be exposed on a front side of the adapter plate 104" (to be described in more detail in association with FIG. 10).

In one example, the diameter of the interface 122' may be approximately 3.75 inches. The mounting holes 450 may be inset within the interface 122". For example, the distance between the mounting hole 450a and the mounting hole 450d may be 3.5 inches apart and the distance between the mounting hole 450b and the mounting hole 450c may be 3.5 inches apart (e.g., the same distance as the distance between the threaded pins 424a-424b). In an example, the adapter plate 104" may be 12 inches tall, 7 inches wide and 1 inch thick. The custom bracket 410 may enable a back side of the adapter plate 104" to connect to the junction box 66 via the interface 122".

The back side of the adapter plate 104" may comprise ribbing 452. The ribbing 452 is shown as a grid pattern. The ribbing 452 may be a thicker portion of the material of the housing of the adapter plate 104". The ribbing 452 may be configured to reinforce the structural integrity of the adapter plate 104" (e.g., increase the strength of the adapter plate 104"). In an example, the ribbing 452 may comprise a plastic material.

The speaker grille 210 is shown. A space 454 is shown behind the speaker grille 210. In the example shown, the space 454 may not comprise any of the ribbing 452. The space 454 may provide a location between the wall 50 and the adapter plate 104" to fit the speaker 126' and/or the power adapter 124.

Figure 10:
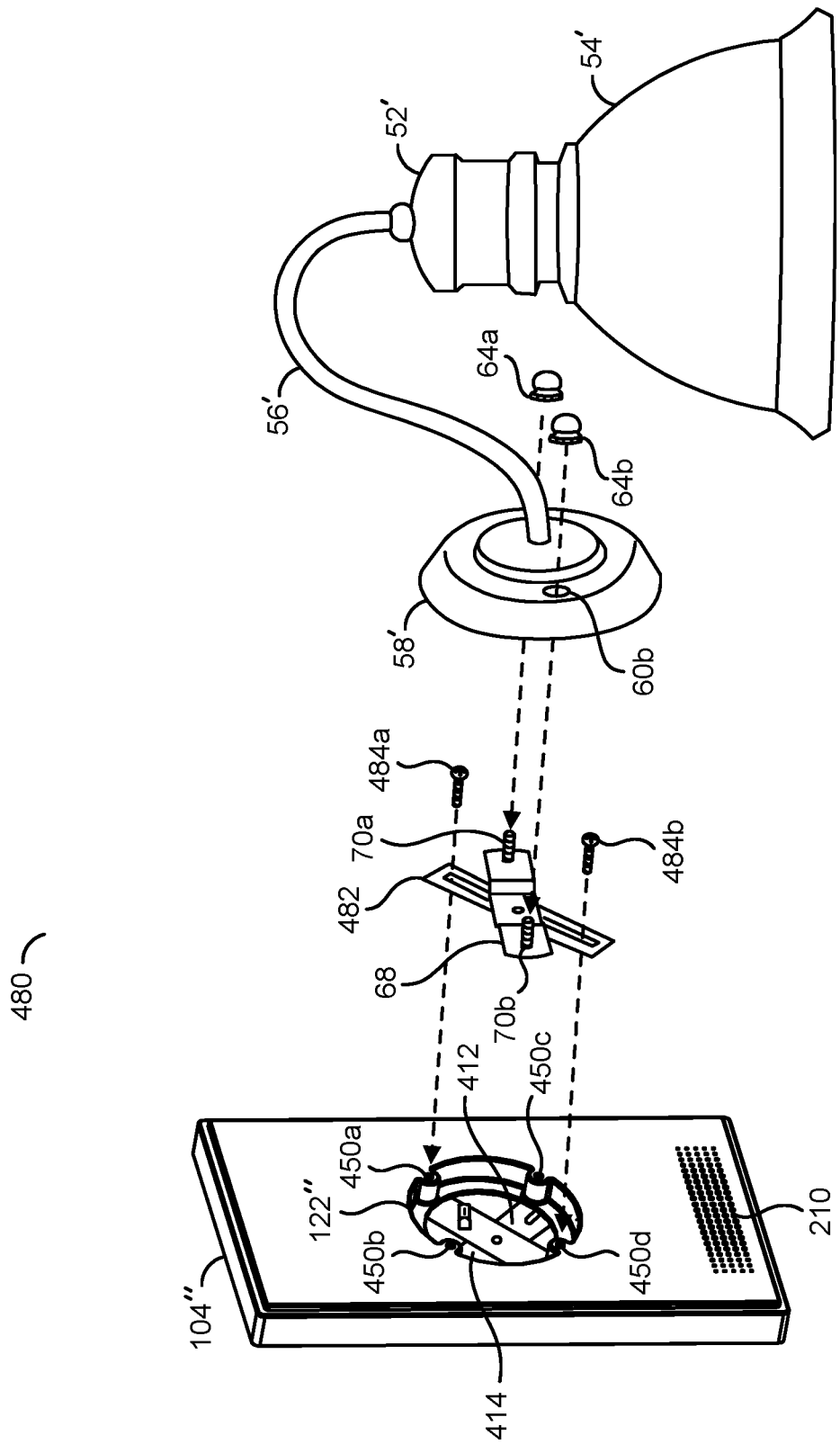
FIG. 10 is a diagram illustrating attaching a light fixture to a mounted camera wall plate.

Referring to FIG. 10, a diagram illustrating a front view of an example of a wall plate base is shown. An exploded view 480 of mounting hardware for the light fixture 52' is shown. The exploded view 480 may comprise the adapter plate 104", the mounting bracket 68 and the light fixture 52'. The lamp shade 54', the connector 56', the light fixture mounting plate 58', the mounting hole 60b and the locking nuts 64a-64b are shown. The lamp shade 54', the connector 56', the light fixture mounting plate 58', the mounting hole 60b and the locking nuts 64a-64b may all be components of the light fixture 52' (e.g., not part of the apparatus 100).

A front side of the adapter plate 104" is shown. In the exploded view 480, a front side of the interface 122" is visible (e.g., the interface 122" may be covered by the light fixture mounting plate 58' when the light fixture 52' is attached to the adapter plate 104"). The first piece 412 and the second piece 414 of the custom mounting bracket 410 may be visible through the interface 122". For example, the custom mounting bracket 410 may be covered by the adapter plate 104″ when the adapter plate 104″ is attached to the wall 50. The mounting holes 450*a*-450*d* are shown in the interface 122″.

Crossbars (or a cross-bracket) are shown comprising the bracket 68 and the slot bar 482. The crossbars may be the mounting hardware that may be provided with the light fixture 52′. In the example shown, the mounting screws 70*a*-70*b* are shown on either side of the bracket 68. In some embodiments, the bracket 68 may comprise a threaded fixture piping (e.g., a single threaded protrusion extending from the center of the bracket 68). The implementation of the crossbars may be varied according to the design criteria of a particular implementation.

The crossbars may be the mounting hardware from the junction box 66 to the user supplied light sconce 52′. In a standard light fixture installation the crossbars may be secured to the junction box 66. When implementing the camera wall plate 100′, the custom mounting bracket 410 of the camera wall plate 100′ may be secured to the junction box 66 and the crossbars may be secured to the camera wall plate 100′ using the interface 122″.

The mount-plate 58′ of the user supplied light sconce 52′ may be bigger than the hole (e.g., part of the interface 122″) in the camera wall plate 100′ and may provide the clamping force to secure the camera wall plate 100′ between the wall 50 and the user supplied light sconce 52′ (e.g., the light fixture). In addition, the camera wall plate 100′ has one or more screws at the bottom to secure the bottom part 106′ of the camera wall plate 100′ directly to the wall 50 (or indirectly to the wall 50 using the secure bracket 280 shown in association with FIG. 5). The camera wall plate 100′ may provide a retrofit for the existing light fixture 52′. The camera wall plate 100′ may enable the homeowner to use an existing light fixture and utilize the features and/or functionality provided by the camera wall plate 100′ (e.g., implemented by the components 256*a*-256*n* and/or the camera module 120′). By implementing the retrofit, the circuit 252 may be configured to control a status of the light 80 of the light fixture 52′ by controlling when the controlled AC power is provided to the light 80.

The threaded pins 424*a*-424*b* may be exposed on the front side of the adapter plate 104″ through the mounting holes 450*a*-450*d*. In the example shown, based on the orientation of the second piece 414, the threaded pin 424*a* may be exposed by fitting into the mounting hole 450*a* and the threaded pin 424*b* may be exposed by fitting into the mounting hole 450*d*.

Fixture mounting screws 484*a*-484*b* are shown in the exploded view 480. The fixture mounting screws 484*a*-484*b* may be configured to fit through the slot of the slot bar 482. The threaded portion of the fixture mounting screws 484*a*-484*b* may fit through a slot on the slot bar 482 and the head of the fixture mounting screws 484*a*-484*b* may not fit through the slot on the slot bar 482 (e.g., to secure the slot bar 482 when screwed in). When installing the crossbars of the light fixture 52′ to the adapter plate 104″, the slot bar 482 may be aligned with the mounting holes 450*a*-450*d* that have the threading from the threaded pins 424*a*-424*b* exposed. The fixture mounting screws 484*a*-484*b* may fit through the slot bar 482 and screw into the threaded pins 424*a*-424*b* via the corresponding mounting holes 450*a*-450*d* of the interface 122″. In the example shown, the slot bar 482 may be aligned with the mounting hole 450*a* and the mounting hole 450*d*, and then the fixture mounting screw 484*a* may screw into the threaded pin 424*a* in the mounting hole 450*a* and the fixture mounting screw 484*a* may screw into the threaded pin 424*b* in the mounting hole 450*d*.

Screwing the mounting screws 484*a*-484*b* into the threaded pins 424*a*-424*b* may secure the light fixture crossbars (e.g., the bracket 68 and the slot bar 482) to the adapter plate 104″. The adapter plate 104″ may be secured to the junction box 66 by attaching the custom mounting bracket 410 to the junction box 66. Attaching the light fixture screws 484*a*-484*b* may provide the compression force between the wall 50 (and junction box 66) and crossbars of the light fixture 52′ (e.g., the bracket 68 and the slot bar 482) that may secure the apparatus 100′. The mounting screws 70*a*-70*b* may be inserted through the mounting holes 60*a*-60*b* of the light fixture mounting plate 60*a*-60*b* to provide support for the light fixture 52′. The locking nuts 64*a*-64*b* may be attached to the mounting screws 70*a*-70*b* to secure the light fixture 52′ to the crossbars (and the adapter plate 104″, and the custom mounting bracket 410 and the junction box 66) and provide a decorative cover for the mounting screws 70*a*-70*b*.

The custom mounting bracket 410 may be secured to the junction box 66 by inserting the junction box screws 428*a*-428*b* into the junction screw holes 402*a*-402*b* when the bubble levels 426*a*-426*b* are level (e.g., to ensure that the threaded pins 424*a*-424*b* are in the correct 45 degree position). The adapter plate 104″ may slide over the custom mounting bracket 410 using the mounting holes 450*a*-450*d* over the threaded pins 424*a*-424*b*. The second piece 414 may be reversed (e.g., depending on the mounting hardware of the light fixture 52′). For example, the threaded pins 424*a*-424*b* may fit into the mounting holes 450*a* and 450*d* when the second piece 414 is in a first orientation (e.g., aligned using the bubble level 426*a*) and the threaded pins 424*a*-424*b* may fit into the mounting holes 450*b* and 450*c* when the second piece 414 is in a second orientation (e.g., aligned using the bubble level 426*b*).

The cross bracket (e.g., the bracket 68 and the slot bar 482) provided with the light fixture 52′ may be attached to the adapter plate 104″ by inserting the fixture mounting screws 484*a*-484*b* into two of the mounting holes 450*a*-450*d* with the threaded pins 424*a*-424*b*. The threaded pins 424*a*-424*b* may be threaded on the inside to attach to the fixture mounting screws 484*a*-484*b*. The light fixture 52′ may be attached to the crossbars (e.g., to the bracket 68 using the mounting screws 70*a*-70*b*). When the threaded pins 424*a*-424*b* are inserted into the mounting holes 450*a*-450*d*, the interface 122″ may enable the light fixture 52′ to connect to a front side of the adapter plate 104″

Figure 11:
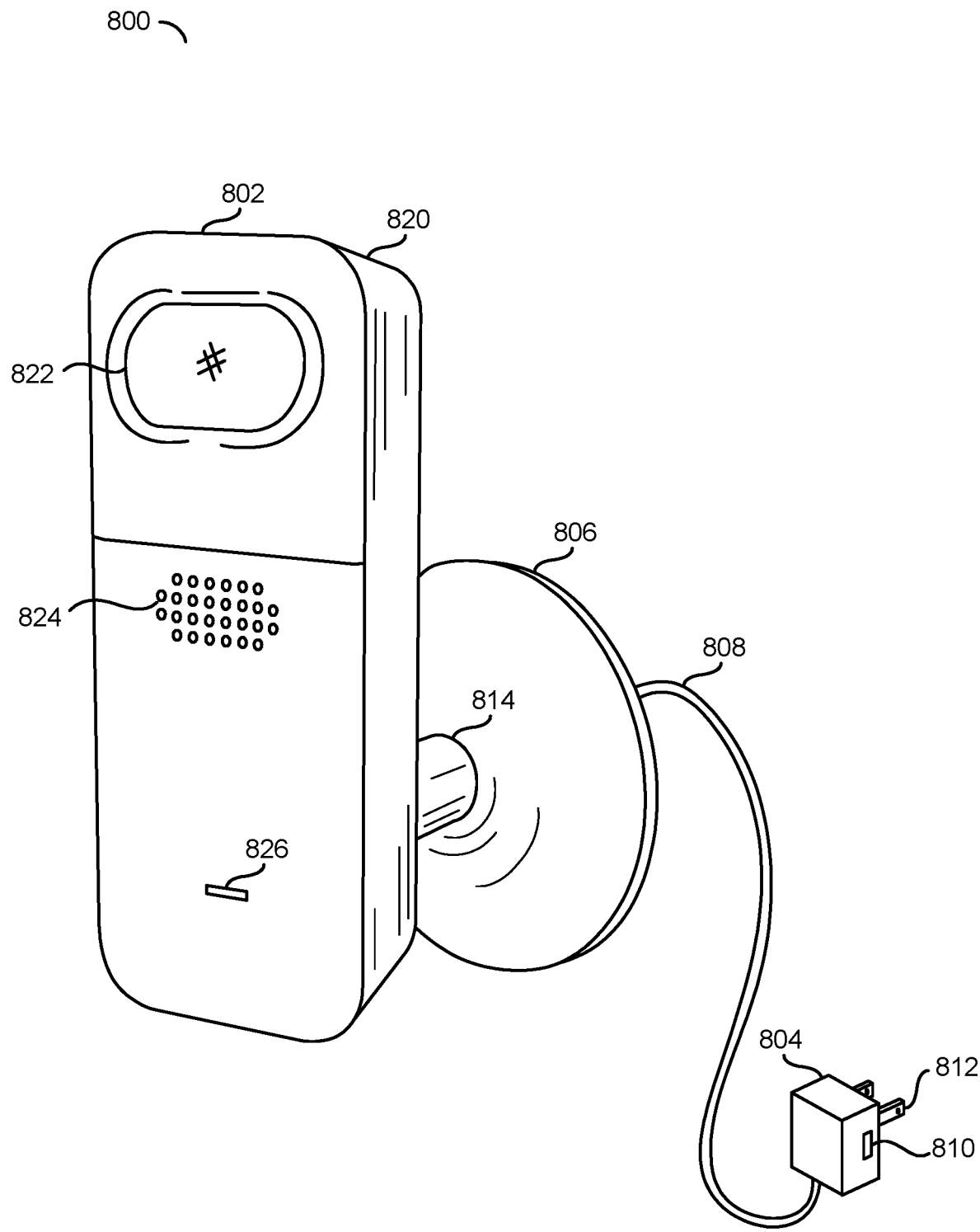
FIG. 11 is a diagram illustrating an example embodiment of a mounted camera connected to a power adapter with a peripheral connector.

Referring to FIG. 11, a diagram illustrating an example embodiment of a mounted camera connected to a power adapter with a peripheral connector is shown. An apparatus 800 is shown. The apparatus 800 may comprise a camera 802 (e.g., a capture device) and a power adapter 804.

The apparatus 800 may comprising the power adapter 804 and the capture device 802. The power adapter 804 may comprise a supply interface configured to receive power from a power source, a converter configured to convert the power to a DC supply, a peripheral interface configured to communicate with at least one peripheral device and an AC interface. The capture device 802 may comprise a camera module configured to capture video data, a communication device configured to communicate with a network, a processor and an interface configured to connect with the power adapter 804. The capture device 802 may receive power from the power adapter 804. The capture device 802 may communicate data to the peripheral device via the interface. The capture device 802 may receive output data from the peripheral device via the interface. The apparatus 800 may be configured to provide camera functionality to the peripheral device. The peripheral device may expand a functionality of the apparatus 800.

Embodiments of the camera module 120' and/or the circuit 252 shown in association with FIGS. 4-10 may have a similar functionality as the smart camera 802. For example, the components 256a-256n may implement functionality of the smart camera 802 described in association with FIGS. 11-20.

The apparatus 800 may be configured to communicate data between the smart camera 802 and a peripheral device. The apparatus 800 may be configured to add a camera and smart functionality to a peripheral device. The apparatus 800 may be configured to enable the smart camera 802 to react to data from a peripheral device. The apparatus 800 may be configured to provide AC and DC power. The apparatus 800 may be configured to provide a low-cost functionality enhancement. The apparatus 800 may be configured to be implemented indoors and/or outdoors. The apparatus 800 may be configured to enable wired and/or wireless data communication. The apparatus 800 may be configured to be implemented as one or more integrated circuits.

Embodiments of the present invention may implement residential security cameras (e.g., indoor and outdoor), that provide control signals and data in both directions to a power adapter that connects to other home electronics. The power adapter may incorporate local communication hardware (e.g., wired and/or wireless). Embodiments of the present invention may provide the benefit of the resources from an IoT camera (e.g., cloud connection, computational processing, memory, etc.), and pass the resources to other home electronics (e.g., sirens, lighting, pet-related devices, etc.).

The camera 802 may be a smart camera. The smart camera 802 may be configured to implement recording, processing and/or analysis of still images and/or video data. The smart camera 802 may be configured to implement internet-connectivity (wired or wireless). The internet-connectivity may enable the smart camera 802 to communicate with cloud services to expand the functionality and/or storage capacity available to the smart camera 802. The features and/or functionality implemented by the smart camera 802 (e.g., locally and/or via cloud services) may be varied according to the design criteria of a particular implementation.

The power adapter 804 may connect to a power source (e.g., an AC power supply of a premises). In an example, the power adapter 804 may provide AC power to the smart camera 802. The power adapter 804 may be configured to convert the AC power to a DC power supply. In some embodiments, the power adapter 804 may provide the DC power supply and/or the AC power supply to the smart camera 802. In some embodiments, the smart camera 802 may be configured to operate using the DC power supply. In some embodiments, the smart camera 802 may be configured to operate using the AC power supply.

The smart camera device 802 is shown connected to a mount 806. In the example shown, the mount 806 may be implemented as a wall mount. The mount 806 may enable the smart camera 802 to be securely attached to a surface (e.g., a wall, a ceiling, furniture, a fence, etc.) as desired by a user. Enabling the user to attach the smart camera 802 to the surface using the mount 806 may enable the smart camera 802 to capture a field of view from a desired vantage point.

A cable 808 is shown. The cable 808 may be configured to connect the smart camera 802 to the power adapter 804. The cable 808 may be configured to communicate power and/or data between the smart camera 802 and the power adapter 804. In an example, the cable 808 may transmit an AC power supply from the power adapter 804 to the smart camera 802. Data and/or control signals generated by the smart camera 802 may be communicated to the power adapter 804 using the cable 808. Similarly, data and/or control signals may be communicated by the power adapter 804 to the smart camera 802. In some embodiments, the cable 808 may transmit power between the smart camera 802 and the power adapter 804 and data and/or control signals may be communicated wirelessly between the smart camera 802 and the power adapter 804. In the example shown, the cable 808 may be routed through the mount 806 to the smart camera 802.

The power adapter 804 is shown having an interface 810 and an interface 812. The interface 810 may be a peripheral interface (e.g., a peripheral port). The interface 812 may be prongs configured to connect to an electrical outlet. The peripheral port 810 may be configured to connect to a peripheral device (not shown). In one example, the peripheral port 810 may be a USB port (e.g., a USB-C port). In another example, the peripheral port 810 may be a UART port. The implementation of the peripheral port 810 may be varied according to the design criteria of a particular implementation.

The prongs 812 may be configured to connect to a power source of a premises (e.g., an electrical outlet, not shown). Connecting the prongs 812 to the power source may enable the power adapter 804 to receive an AC power supply. The power adapter 804 may be configured to convert the AC power supply to the DC power supply. The shape of the prongs 812 and/or the type of conversion implemented may be varied according to the standards of the region the apparatus 800 is implemented in.

A mounting arm 814 is shown. The mounting arm 814 may connect the smart camera 802 to the mount 806. In some embodiments, the mounting arm 814 may provide access for the cable 808 to the smart camera 802. In one example, the mounting arm 814 may be rigid (e.g., non-movable). In another example, the mounting arm 814 may be flexible to enable the smart camera 802 to be moved and/or tilted (e.g., to adjust the field of view captured by the smart camera 802).

The smart camera 802 may comprise a housing 820. The housing 820 may be a material used to form an enclosure for the various components of the smart camera 802. In an example, the housing 820 may be a plastic material. In some embodiments, the housing 820 may be implemented to provide weatherproofing to enable the apparatus 800 to be implemented outdoors as well as indoors. The materials, shape and/or size of the housing 820 may be varied according to the design criteria of a particular implementation.

The smart camera 802 may comprise a lens 822, a speaker grille 824 and/or a microphone grille 826. The lens 822 may enable a camera sensor implemented within the smart camera 802 to capture images and/or video data. The speaker grille 824 may enable audio output generated by a speaker within the housing 820 to be projected. The microphone grille 826 may enable audio input to reach a microphone implemented by the smart camera 802 within the housing 820. Video recording, audio output and/or audio input may be examples of functionality implemented by the smart camera 802. The smart camera 802 may implement other functionality (not shown).

In an example, a status light (e.g., to indicate whether video is being recorded) may be implemented on the outside of the housing 820. Many of the components that perform the functionality of the smart camera 802 may be implemented within the housing 820 (e.g., the camera sensor, the speaker, the audio processor, the video processor, the Wi-Fi/Bluetooth antenna, the microphone, etc.). The number, type and/or arrangement of the components of the smart camera 802 may be varied according to the design criteria of a particular implementation.

Figure 12:
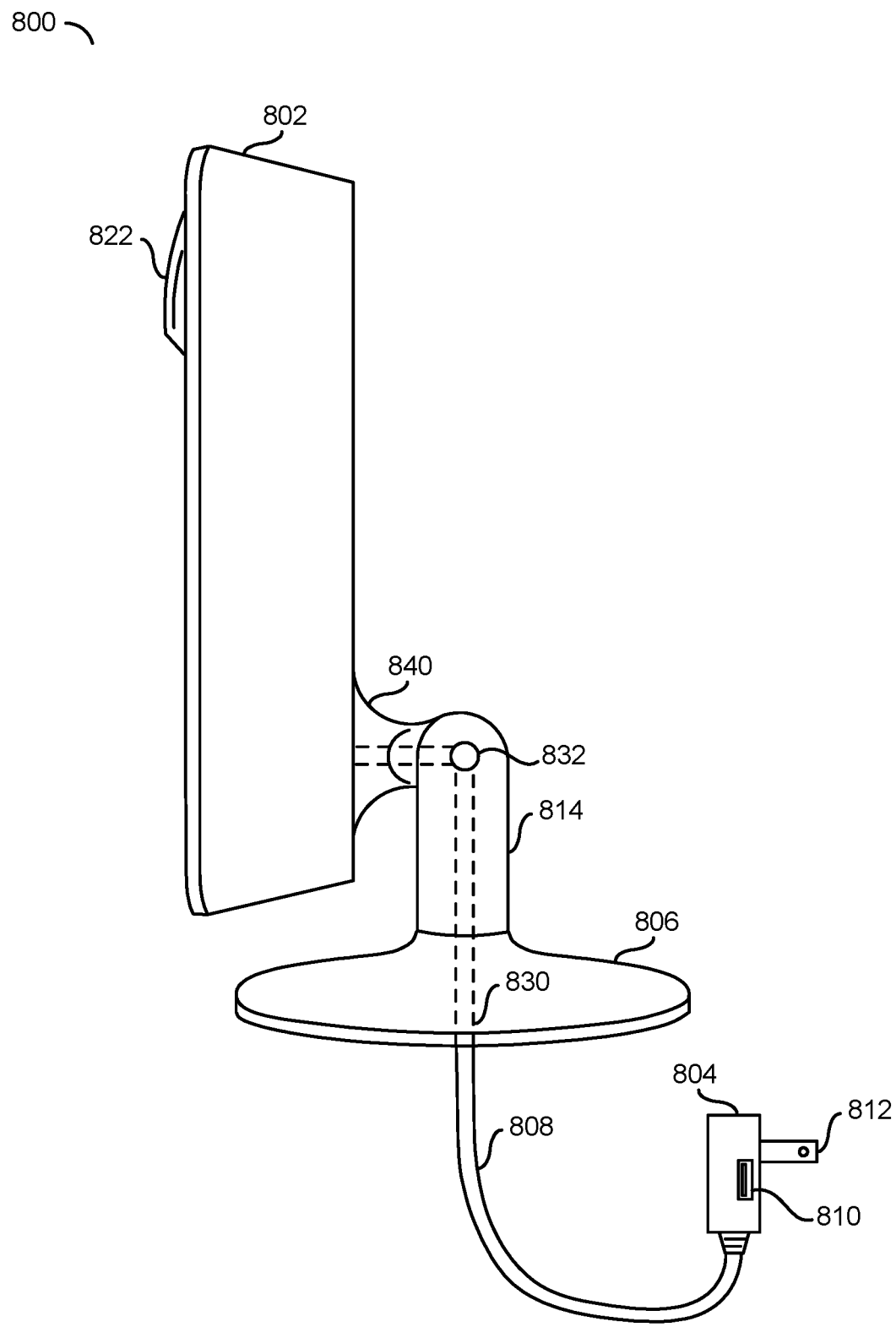
FIG. 12 is a diagram illustrating an alternate view of a mounted camera connected to a power adapter with a peripheral connector.

Referring to FIG. 12, a diagram illustrating an alternate view of a mounted camera connected to a power adapter with a peripheral connector is shown. A side view of the apparatus 800 is shown. A side view of the smart camera 802, the power adapter 804, the mount 806 and the cable 808 is shown. The lens 822 may be visible from the side view (e.g., shown angled slightly upwards) of the smart camera 802. One of the prongs 812 is shown on the power adapter 804. The peripheral interface is shown on the side of the power adapter 804 (e.g., as a USB type A port).

The mount 806 and the mounting arm 814 are shown. A hollow channel 830 is shown within the mount 806 and the mounting arm 814. A pivot point 832 is shown on the mounting arm 814. In an example, the pivot point 832 may be a ball joint. The pivot point 832 may be connected to a connector arm 840. The connector arm 840 may attach to the smart camera 802. The connector arm 840 may secure the smart camera 802 to the mounting arm 814 and the mount 806. The connector arm 840 may be movable about the pivot point 832. For example, moving the connector arm 840 at the pivot point 832 may enable the smart camera 802 to face a different direction.

In the example shown, the cable 808 may be routed through the mount 806, the mounting arm 814 and the connector arm 840. For example, the hollow channel 830 may run through the mount 806, the mounting arm 814 and the connector arm 840 to route the cable 808. The hollow channel 830 may enable the mount 806, the mounting arm 814 and the connector arm 840 to hide the cable 808 (e.g., appear as a wireless connection). In one example, the cable 808 may have a connector at one end for connecting to the mount 806 and/or the smart camera 802. For example, the connector of the cable 808 may be a 3.5 mm connector.

The cable 808 may be a thin cable (e.g., 2 mm diameter or less, gauge 32 wires with high resistance). Implementing the cable 808 as a thin cable may enable the connection between the smart camera 802 and the power adapter 804 to be as invisible as possible. For example, the cable 808 may be paintable by implementing a transparent paintable shield (e.g., to imitate the look of a wireless connection).

The power adapter 804 may be designed to allow a significant voltage drop (e.g., greater than 5 volts) across the thin cable 808. The power adapter 804 may be configured to enable a voltage drop of greater than 3.3V. In one example, the power adapter 804 may allow a 6 volt drop (e.g., from 24 volt DC to 18 volt), use a 20 feet long, 1.5 mm diameter cable 808 with 3 wires. The receiving power circuit may take the 18 volt DC and convert to 3.3 volt (or 5 volt) for internal electronics. The apparatus 800 may also use thin connectors like 2.5 mm earphone connectors, or bare wires to enable small holes in the wall if needed to go through a wall to a power outlet (e.g., from outdoor to indoor as an example, or from one room to another room).

Figure 13:
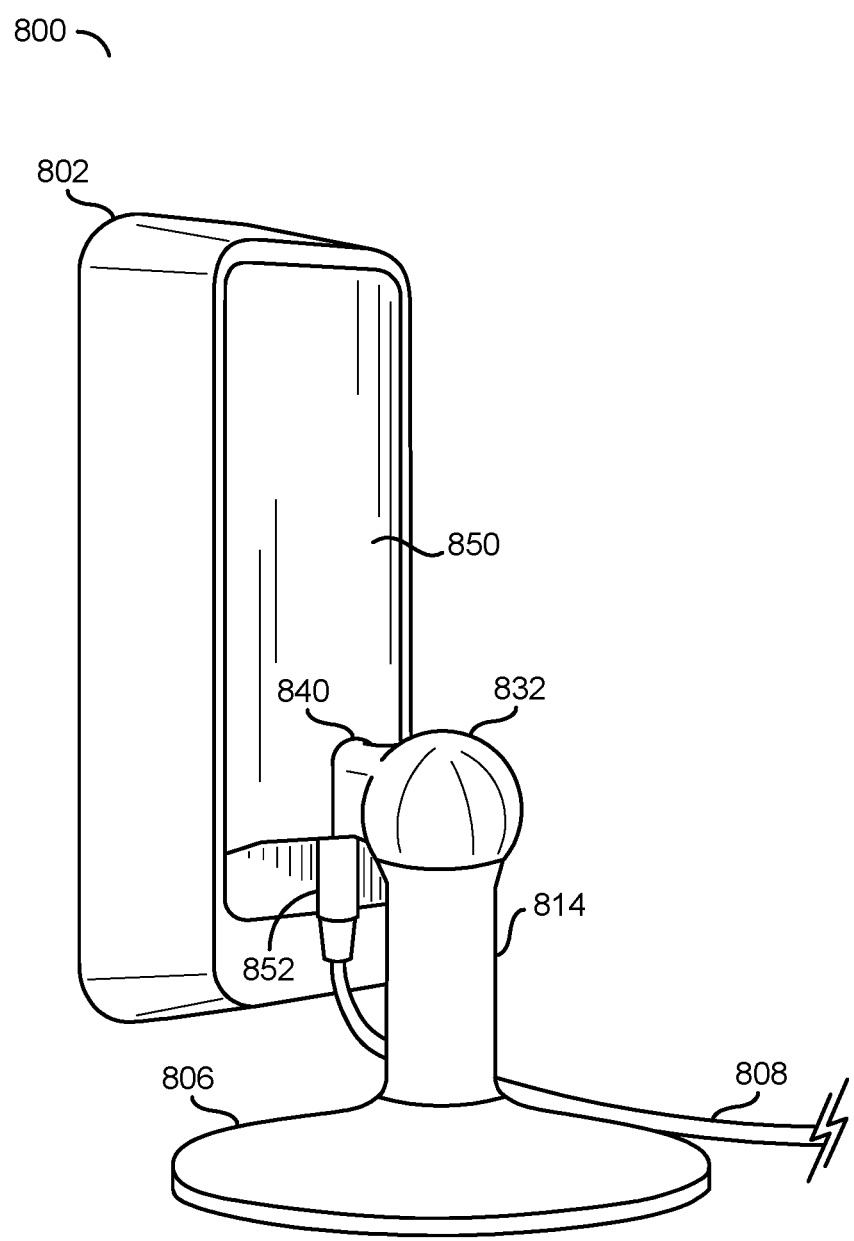
FIG. 13 is a diagram illustrating an example of a mounted camera connected to a power adapter with a peripheral connector attached to a mounting device.

Referring to FIG. 13, a diagram illustrating an example of a mounted camera connected to a power adapter with a peripheral connector attached to a mounting device is shown. A rear view of the apparatus 800 is shown. A rear view of the smart camera 802, the mount 806, the cable 808, the mounting arm 814, the pivot point 832 and the connector 840 is shown. In the rear view of the apparatus 800, the power adapter 804 is not shown but would be attached to the cable 808.

A bracket 850 is shown. The bracket 850 may connect directly to the smart camera 802. The bracket 850 may enable the smart camera 802 to be connected to the mount 806, the mounting arm 814 and/or the connector arm 840. In some embodiments, the bracket 850 and the connector arm 840 may be a single piece of material (e.g., a single piece that attaches to the pivot point 832). The smart camera 802 may be removably connected to the bracket 850.

The mount 806 may support the smart camera 802. In the example shown, the mount 806 may be in a horizontal orientation (e.g., located on the floor or on a table). For example, the mount 806 may be configured as a wall mount that may fit different designs of the smart camera 802. The bracket 850 may enable different designs of the smart camera 802 to be connected to the mount 806. By connecting the bracket 850 to the pivot point 832, adjustability for the smart camera 802 may be implemented (e.g., the ball joint may enable rotation so that the smart camera 802 can be moved to face different directions). For example, the mount 806 may be configured to provide support and/or a connection to a surface (e.g., a wall), the mounting arm 814 may extend the smart camera 802 away from the mounting surface (e.g., to provide room to tilt or pan), the pivot point 832 and the connector arm 840 may enable the smart camera 802 to be moved, and the bracket 850 may secure the smart camera 802 to the mount 806.

A cable connector 852 is shown at the end of the cable 808. The cable connector 852 may provide an AC power input to the smart camera 802. The smart camera 802 may receive AC power from the power adapter 804 when seated on (or attached to) the bracket 850. In one example, an AC outlet on the smart camera 802 may be configured to accept small connectors less than 5 mm in diameter. In an example, the cable connector 852 may be a 2.5 mm connector. In some embodiments, the cable connector 852 may connect to the smart camera 802 through the bracket 850. In some embodiments, the cable connector 852 may connect directly to the AC outlet on the smart camera 802.

Figure 14:
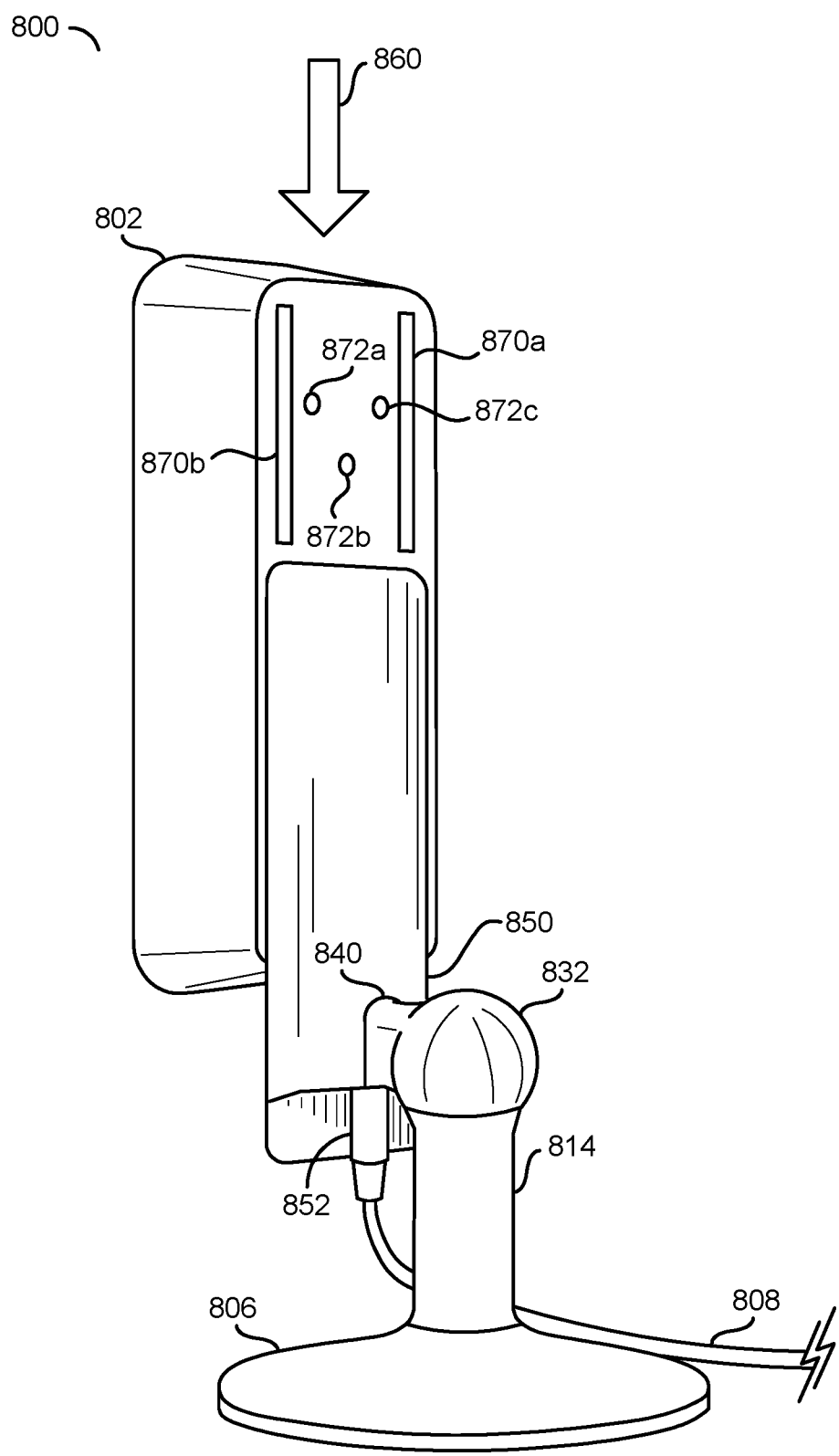
FIG. 14 is a diagram illustrating attaching a mounted camera connected to a power adapter with a peripheral connector to a mounting device.

Referring to FIG. 14, a diagram illustrating attaching a mounted camera connected to a power adapter with a peripheral connector to a mounting device is shown. A rear view of the apparatus 800 is shown. A rear view of the smart camera 802, the mount 806, the cable 808, the mounting arm 814, the pivot point 832, the connector 840, the bracket 850 and the cable connector 852 is shown. In the rear view of the apparatus 800, the power adapter 804 is not shown but would be attached to the cable 808.

An arrow 860 is shown. The arrow 860 may be above the smart camera 802 and directed downwards. The downwards arrow 860 may illustrate that the smart camera 802 may slide down onto the bracket 850. Sliding the smart camera 802 onto the bracket 850 may secure the smart camera 802 to the bracket 850 (e.g., and to the mount 806).

Mounting connectors 870a-870b are shown on the back of the smart camera 802. In the example shown, the mounting connectors 870a-870b may be configured as tracks and/or rails configured to guide the smart camera 802 to align with the bracket 850. When the smart camera 802 is guided along the tracks 870a-870b in the downward direction 860, the smart camera 802 may be configured to lock onto the bracket 850.

Three electrical connectors 872a-872c (e.g., terminals) are shown on the back of the smart camera 802. For example, one connector (e.g., the terminal 872a) may be a power terminal, one connector (e.g., the terminal 872b) may be a ground terminal, and one connector (e.g., the terminal 872c) may be a data and/or control terminal. The bracket 850 may implement a mount that provides weatherproofing for the smart camera 802 (e.g., protects the electrical connectors 872a-872c). The function, and/or layout of the connectors 872a-872c may be varied according to the design criteria of a particular implementation.

When the smart camera 802 is guided onto the bracket 850 in the downward direction 860 shown, the electrical connectors 872a-872c may be configured to connect to respective electrical connectors on the bracket 850. For example, when the smart camera 802 is in the position as shown in FIG. 14, the cable connector 852 may not be making contact with an AC outlet of the smart camera 802. When the smart camera 802 is locked onto the bracket 850, the cable connector 852 may connect with the AC outlet of the smart camera 802 (e.g., at the bottom of the bracket 850). In some embodiments, the cable connector 852 may provide the AC power to connectors implemented on the bracket 850 (not shown) that may attach to the electrical connectors 872a-872c shown on the back of the smart camera 802 when the smart camera is attached to the bracket 850. For example, the bracket 850 may provide a support stand (e.g., a physical connection) and an electrical connection for the smart camera 802. The physical connection may be to the mount 806. The electrical connection may be to the cable 808 (and then to the power adapter 804). In some embodiments, when the smart camera 802 is secured to the bracket 850, the cable connector 852 may connect directly to the smart camera 802 (e.g., to the AC outlet on the bottom of the smart camera 802).

Figure 15:
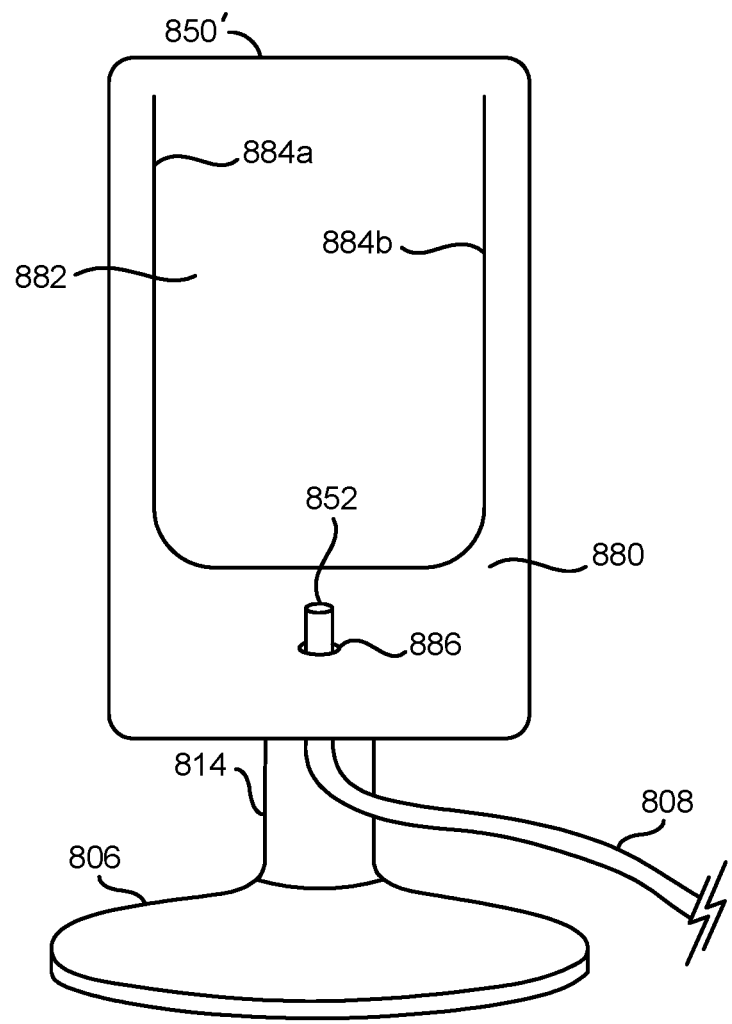
FIG. 15 is a diagram illustrating a mounting device implemented as a stand embodiment.

Referring to FIG. 15, a diagram illustrating a mounting device implemented as a stand embodiment is shown. A view from the front of the bracket 850' is shown. The view of the bracket 850' may further comprise the mount 806, the cable 808, the mounting arm 814, and the cable connector 852. In the view of the front of the bracket 850' the smart camera 802 and the power adapter 804 are not shown. For example, the smart camera 802 may be configured to be attached to the bracket 850' and the power adapter 804 may be attached to the cable 808.

The bracket 850' may comprise a seating portion 880 and a backing portion 882. The seating portion 880 and the backing portion 882 may be configured to hold the smart camera 802. The bottom of the smart camera 802 may rest on the seating portion 880. For example, the seating portion 880 may have a horizontal orientation when viewed from the side or head on. The horizontal orientation of the seating portion 880 may prevent the smart camera 802 from dropping downwards (e.g., the direction 860 shown in association with FIG. 14). The back side of the smart camera 802 may rest against the backing portion 882. For example, the backing portion 882 may have a vertical orientation when viewed from the side or head on. The vertical orientation of the backing portion 882 may prevent the smart camera 802 from tipping backwards.

In the example shown, the bracket 850' may be empty (e.g., the smart camera 802 may not be connected). The backing portion 882 may comprise mounting tracks 884a-884b. The mounting tracks 884a-884b may be configured to guide the smart camera 802 onto the bracket 850' to align with the seating portion 880. In some embodiments, the mounting tracks 884a-884b may be configured to align with the mounting connectors 870a-870b. In some embodiments the mounting tracks 884a-884b may be configured to removably attach to the mounting connectors 870a-870b. For example, the mounting tracks 884a-884b may implement a female track/connector and the mounting connectors 870a-870b may implement a male track/connector to enable the back of the smart camera 802 to fit together with the backing portion 882. Fitting the mounting tracks 884a-884b together with the mounting connectors 870a-870b may enable the smart camera 802 to be secured to the bracket 850'.

The seating portion 880 may comprise an opening 886. The opening 886 may provide a path for the cable connector 852 to push through the seating portion 880. When the cable connector 852 is pushed through the opening 886, the cable connector 852 may protrude from the seating portion 880. The cable 808 is shown being fed to the bottom of the seating portion 880 (e.g., a clip and/or holder may be implemented on the bottom side of the seating portion 880 to prevent the cable 808 from falling loose). The cable connector 852 is shown extending from the seating portion 880 of the bracket 850'. When the cable connector 852 is protruding from the opening 886, the cable connector 852 may provide a quick release and/or quick connect with the smart camera 802. For example, the smart camera 802 may slide onto the bracket 850' and connect with the cable connector 852.

The cable connector 852 may provide AC power, DC power and/or data communication for the smart camera 802. The mounting tracks 884a-884b may guide the smart camera 802 to enable the AC connector on the bottom of the smart camera 802 to align with the location of the opening 886. When the smart camera 802 is guided onto the bracket 850' in the downward direction 860, the smart camera 802 may connect to the cable connector 852 (and receive power from the power adapter 804 via the cable 808). Similarly, the smart camera 802 may be pulled off of the cable connector 852 for a quick release.

The bracket 850' may provide an elegant solution for implementing an indoor/outdoor security camera that controls a security light. The smart camera 802 may be mounted using the bracket 850' and the mount 806. In one example, the peripheral port 810 may be implemented as a USB port. In another example, the peripheral port 810 may be another protocol such as UART. The cable connector 852 may connect to an AC outlet of the smart camera 802. In some embodiments, the cable connector 852 may be similar to an earphone connector. For example, the bracket 852 may have the earphone-style connector 852 connected. The smart camera 802 may slide into the bracket 850' to make an electrical connection from the device (e.g., T-terminals) to the U-shaped clips 884a-884n in the holder backrest 882 of the bracket 850'. In some embodiments, T-terminals may be used (e.g., screw terminals with bare wire connections). In some embodiments, the U-shaped Clips 884a-884n may be used instead of bare wires.

The design of the bracket 850' may comprise the prong 852 to enable the device to slide down to make electrical contact. The power plug 852 may be inserted into the bracket 850', via the hole 886 (e.g., thread through) or external connection.

Figure 16:
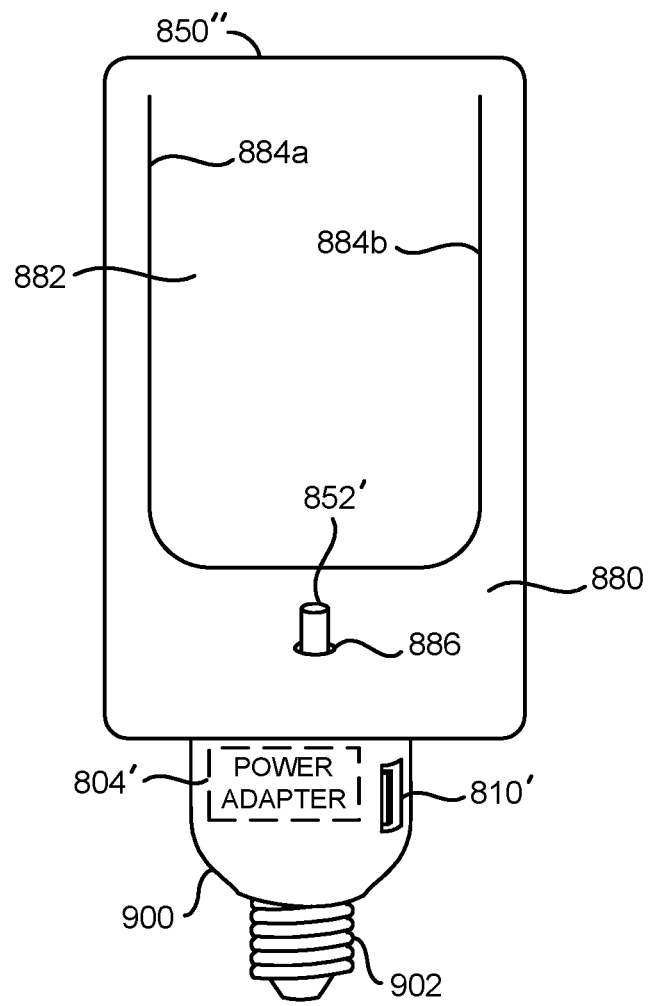
FIG. 16 is a diagram illustrating a mounting device implemented as a light socket adapter embodiment.

Referring to FIG. 16, a diagram illustrating a mounting device implemented as a light socket adapter embodiment is shown. A view from the front of the bracket 850" is shown. The view of the bracket 850" may further comprise the seating portion 880, the backing portion 882, the mounting tracks 884a-884b and the opening 886. In the view of the front of the bracket 850" the smart camera 802 is not shown. For example, the smart camera 802 may be configured to be attached to the bracket 850".

In the example shown, the bracket 850" may be connected to a light socket adapter 900. The light socket adapter 902 may comprise the power adapter 804'. For example, the power adapter 804' may be implemented within the light socket adapter 900. The peripheral port 810' is shown on the light socket adapter 900 (e.g., as a USB-style port). The cable connector 852' may be attached to one end of the light socket adapter 900. The cable connector 852' may protrude through the opening 886 when the bracket 850" is attached to the light socket adapter 900. The light socket adapter 900 may further comprise a light bulb connector 902.

The example embodiment shown with the light socket adapter 900 attached to the bracket 850" may have an implementation similar to the example bracket 850' shown in association with FIG. 15. For example, the cable connector 852' may provide the electrical connection to the power adapter 804'. The mounting tracks 884a-884b may guide the smart camera 802 onto the seating portion 880 to align with and connect to the cable connector 852'.

The light bulb connector 902 of the light socket adapter 900 may provide a standard light bulb connector (e.g., an E26 connector). The light bulb connector 902 may enable the power adapter 804' to receive power from a standard light bulb socket. For example, in an outdoor environment (e.g., where an electrical plug may not be available, but a light bulb socket for an outdoor light may be available), the AC power may be alternately received from the premises using a light bulb socket. For example, the light bulb socket may provide the AC power from the premises. The light socket adapter 900 may screw into the light bulb socket to provide a physical and electrical connection (e.g., similar to how a light bulb screws into a light bulb socket). The power adapter 804' may receive the AC power via the light bulb connector 902. The power adapter 804' may provide the power to the smart camera 802 via the cable connector 852'. The power adapter 804' may convert the AC power to a DC power supply that may be available via the peripheral port 810'.

For outdoor cameras (e.g., other than video doorbells) that need power, the light socket adapter 900 may act as a wall power outlet. The light socket power adapter 804' may enable the features of the smart camera 802 similar to the power adapter 804. In practice, the light socket power adapter 804' may have additional limitations in size in order to fit inside a light fixture.

Generally, peripherals for outdoor environments may be different than indoor peripherals. For example, the peripherals may comprise Christmas lights (e.g., decorative lights), illuminated street number signs, a siren, an outdoor weather station, etc. Generally, the implementation of the additional functionality and internet-connection provided by the smart camera 802 may be similar when implemented indoors or outdoors. The power adapter 804' may be weatherproof for outdoor applications.

Figure 17:
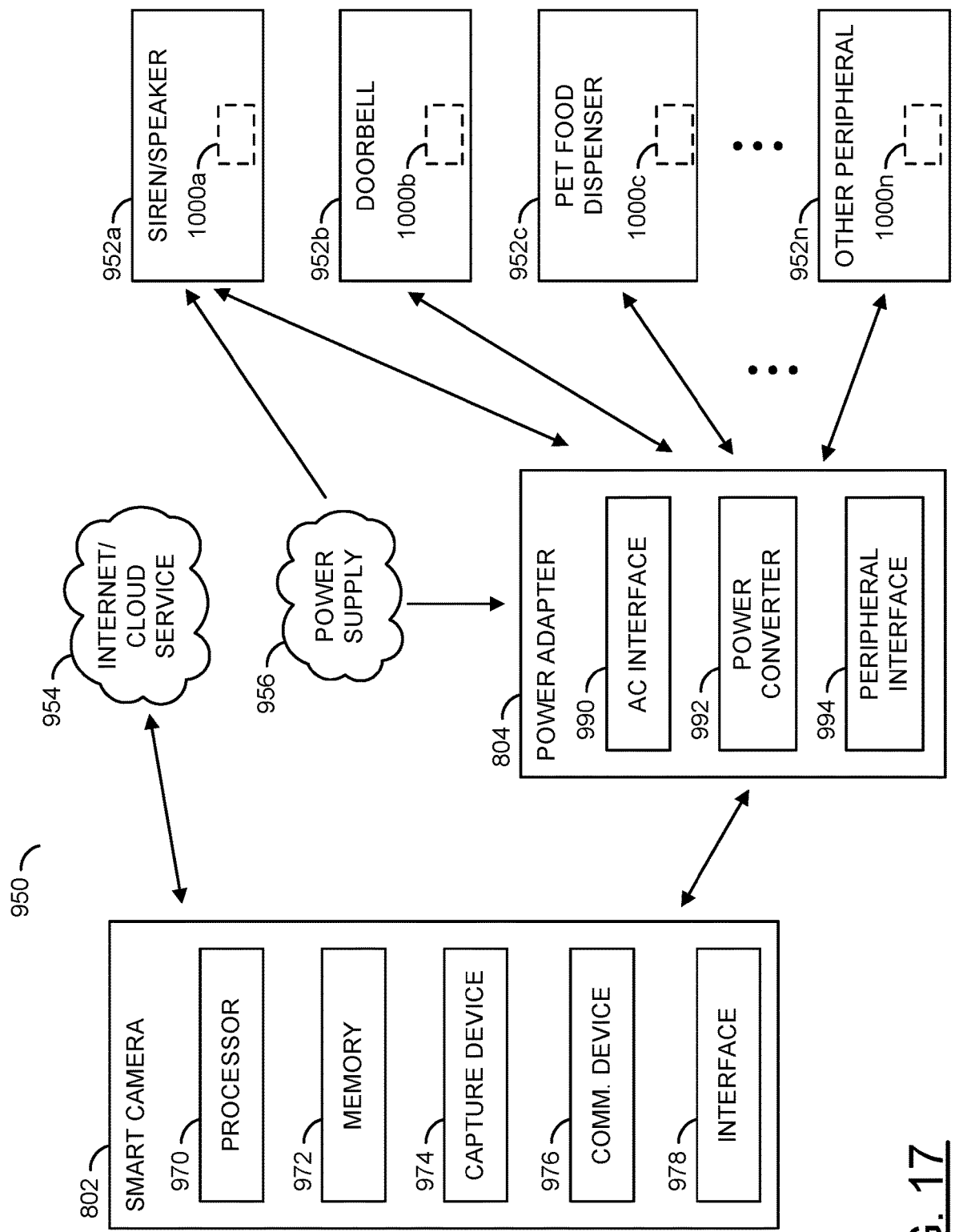
FIG. 17 is a block diagram illustrating a smart camera, a power adapter and peripheral devices.

Referring to FIG. 17, a block diagram illustrating a smart camera, a power adapter and peripheral devices is shown. A system 950 is shown. The system 950 may comprise the apparatus 800 connected to various peripheral devices. The apparatus 800 may be internet-connected. The interconnection between the apparatus 800 and the peripheral devices may enable the apparatus 800 to enhance the capabilities of the peripheral devices by providing camera functionality and internet-connectivity.

The system 950 may comprise the smart camera 802, the power adapter 804, blocks (or circuits) 952a-952n, a block (or circuit) 954 and/or a block (or circuit) 956. The circuits 952a-952n may implement peripheral devices. The circuit 954 may be internet and/or cloud services. The circuit 956 may be a power supply (e.g., a power supply of the premises). The system 950 may comprise other components (not shown). The number, type and/or arrangement of the components of the system 950 may be varied according to the design criteria of a particular implementation.

The peripheral devices 952a-952n may be various devices configured to implement independent functionality. In an example, each of the peripheral devices 952a-952n may comprise various components (e.g., a processor, a memory, circuitry, logic, sensors, actuators, etc.). Each of the peripheral devices 952a-952n may be configured to operate independent of the other peripheral devices 952a-952n and/or independent of the apparatus 800.

For example, each of the peripheral devices 952a-952n may operate independently of the power adapter 804 and/or the smart camera 802. Similarly, the smart camera 802 and/or power adapter 804 may operate independently of the peripheral devices 952a-952n. The smart camera 802 and/or power adapter 804 may enhance (e.g., add to) the functionality of the peripheral devices 952a-952n (e.g., by providing smart camera functionality and/or a wireless cloud connection to a cloud service). Similarly, the peripheral devices 952a-952n may add to the functionality of the smart camera 802 and/or power adapter 804. For example, the siren/speaker may provide a sound output functionality to the smart camera. In the example shown, the peripheral devices 952a-952n may comprise a siren/speaker 952a, a doorbell/chime 952b, a pet food dispenser 952c and/or other types of devices. The functionality implemented by each of the peripheral devices 952a-952n may be varied according to the design criteria of a particular implementation.

In some embodiments, the peripheral devices 952a-952n may be self-powered devices (e.g., battery powered). In some embodiments, the peripheral devices 952a-952n may be powered by the power supply 956 (e.g., implement an AC plug). The power adapter 804 may be configured to provide power to the peripheral devices 952a-952n. For example, the peripheral devices 952a-952n may comprise a plug (e.g., a USB plug) to connect to the peripheral port 810 implemented by the power adapter 804. In an example, the peripheral devices 952a-952n may receive power from the power supply 956 (e.g., independent of the apparatus 800) when operating independently and connect to the power adapter 804 when operating with the apparatus 800. For example, the power adapter 804 may supply DC power to the peripheral devices 952a-952n.

In some embodiments, the peripheral devices 952a-952n may be extremely inexpensive devices (e.g., that use an analog to digital convertor as a base unit). Examples of inexpensive peripheral devices 952a-952n may comprise a water sensor (e.g., for basement water leak detection), a temperature sensor (e.g., for monitoring a fridge/freezer and/or remotely monitoring water pipes in a cabin in the winter), a controllable pet toy, an outlet control, an IR transmitter, a siren, a door chime, dynamic lighting, radios, speakers and/or a humidity sensor. In some embodiments, the peripheral devices 952a-952n may implement multiple outlet control. Multiple outlet control using the apparatus 800 may be a cheaper alternative to Wi-Fi and/or Bluetooth. For example, outlet control may enable devices connected to an outlet to be activated/deactivated remotely. In one example, an air conditioner may be turned on when a high humidity is detected (e.g., activation/deactivation may be determined based on conditional rules defined by the user using a companion app such as IFTTT). Other examples of the peripheral devices 952a-952n may comprise an IR transmitter (e.g., to turn on a TV and/or radio to create the appearance that the homeowner is home), dynamic RGB light (e.g., a lower-power option to simulate the appearance that a TV is on), radios to communicate with other remote peripherals (e.g., ZigBee, Z-Wave, LoRa, cellular, etc.). The type of peripheral devices 952a-952n implemented may be varied according to the design criteria of a particular implementation.

The internet and/or cloud services 954 may comprise services and/or server computers that may be remotely accessed. The internet connection implemented by the apparatus 800 (e.g., by the smart camera 802) may connect to the internet and/or cloud services 954 to access cloud storage, cloud processing and/or cloud services. The internet and/or cloud services 954 may be configured to store data, retrieve and transmit stored data, process data and/or communicate with other devices. The internet and/or cloud services 954 may implement a cloud computing platform (e.g., distributed computing). In an example, the internet and/or cloud services 954 may be implemented as a group of cloud-based, scalable server computers. By implementing a number of scalable servers, additional resources (e.g., power, processing capability, memory, etc.) may be available to process and/or store variable amounts of data. For example, the internet and/or cloud services 954 may be configured to scale (e.g., provision resources) based on demand. The Internet and/or cloud services 954 may implement scalable computing (e.g., cloud computing). The scalable computing may be available as a service to allow access to processing and/or storage resources without having to build infrastructure (e.g., the provider of the system 950 may not have to build the infrastructure of the internet and/or cloud services 954).

The smart camera 802 may comprise a block (or circuit) 970, a block (or circuit) 972, a block (or circuit) 974, a block (or circuit) 976 and/or a block (or circuit) 978. The circuit 970 may implement a processor. The circuit 972 may implement a memory. The circuit 974 may implement a capture device. The circuit 976 may implement a communication device. The circuit 978 may implement an interface. The smart camera 802 may implement other components (not shown). The number, type and/or arrangement of the components of the smart camera 802 may be varied according to the design criteria of a particular implementation.

The processor 970 may be configured to execute computer readable instructions. By executing the computer readable instructions, the processor 970 may perform one or more steps. The processor 970 may provide intelligent functionality for the smart camera 802. When one or more of the peripheral devices 952a-952n are connected to the apparatus 800, the processor 970 may provide intelligent functionality to the peripheral devices 952a-952n. For example, the processor 970 may be configured to perform computer vision operations to analyze video frames captured by the capture device 974.

The memory 972 may be configured to store data. The memory 972 may store the computer readable instructions that may be executed by the processor 970. The memory 972 may be configured to store video frames, images and/or audio captured by the smart camera 802. The memory 972 may be configured to store credentials for accessing the internet and/or cloud services 954. The memory 972 may be configured to store device IDs for the peripheral devices 952a-952n and/or input (e.g., readings) captured by the peripheral devices 952a-952n.

The capture device 974 may be configured to capture images and/or video data. The captured device 974 may comprise an image sensor and/or an encoder. The capture device 974 may be configured to record video data and/or images of the environment captured through the lens 822. Video data and/or images captured by the capture device 974 may be stored in the memory 972 and/or uploaded/processed by the internet and/or cloud services 954.

The communication device 974 may be configured to communicate data between devices (wired or wirelessly). In an example, the communication device 974 may comprise Ethernet, Wi-Fi, Bluetooth, ZigBee, Z-Wave, etc. For example, the wireless communication protocol may be implemented by the communication device 976 to connect to the internet and/or a cloud service 954.

The interface 978 may be configured to connect the smart camera 802 to the power adapter 804. In an example, the interface 978 may comprise the AC outlet to enable the smart camera 802 to connect to the cable connector 852. The interface 978 may be configured to receive an AC power supply. The interface 978 may be configured to convert an AC power supply to DC power. The interface 978 may be configured to communicate data to/from the power adapter 804.

The power adapter 804 may comprise a block (or circuit) 990, a block (or circuit) 992 and/or a block (or circuit) 994. The circuit 990 may implement an AC interface. The circuit 992 may implement a power converter. The circuit 994 may implement a peripheral interface. The power adapter 804 may comprise other components (not shown). The number, type and/or arrangement of the components of the power adapter 804 may be varied according to the design criteria of a particular implementation.

The AC interface 990 may be configured to receive AC power from the power supply 956 (e.g., a household power source). The AC interface 990 may comprise the prongs 812. The AC interface 990 may be configured to transmit the AC power to the smart camera 802 via the cable 808.

The power converter 992 may be configured to convert the AC power to DC power (e.g., 24V, 18V, 5V, 3.3V, etc.). The power converter 992 may receive the AC power from the AC interface 990. The power converter 992 may perform an AC to DC conversion. The DC power generated by the power converter 992 may be provided to the peripheral devices 952a-952n. In some embodiments, the power converter 992 may transmit the DC power to the smart camera 802. The method and/or components used to convert the AC power to the DC power may be varied according to the design criteria of a particular implementation.

The peripheral interface 994 may be configured to connect the power supply 804 to the peripheral devices 952a-952n. The peripheral interface 994 may connect to the peripheral devices 952a-952n via the peripheral port 810 shown in association with FIG. 11. For example, the peripheral interface 994 may implement a USB connection. The peripheral interface 994 may be configured to transmit DC power to the peripheral devices 952a-952n. The peripheral interface 994 may be configured to communicate data to/from the peripheral devices 952a-952n. The peripheral interface 994 may be expandable. In the example shown in association with FIG. 11, the peripheral port 810 may comprise a single plug. For example, a hub may be implemented to accommodate connections to more than one of the peripheral devices 952a-952n.

Each of the peripheral devices 952a-952n are shown comprising a respective one of the blocks (or circuits) 1000a-1000n. The circuits 1000a-1000n may implement a microprocessor and/or a system-on-chip (SoC). For example, the SoCs 1000a-1000n may comprise a processor, memory, sensors, actuators, etc. The SoCs 1000a-1000n may be configured to implement the functionality of the peripheral devices 952a-952n. Each of the SoCs 1000a-1000n may be programmed and/or customized to perform a particular task (e.g., timing circuits and motors configured to dispense pet food at a particular time of day, a speaker to generate sound, a motion sensor to detect motion, etc.). The number of circuits and/or the types of circuits used to implement the circuits 1000a-1000n may be varied according to the design criteria of a particular implementation.

Generally, implementing the apparatus 800 as a separate device that may connect with the peripherals 952a-952n may have a low cost compared to integrating a camera into each of the peripherals 952a-952n. The connection and exchange of data using the power adapter 804 may enable each of the peripherals 952a-952n to have smart functionality. The interconnection between the apparatus 800 and the peripherals 952a-952n may enable all the devices of the system 950 to be operated using a single phone app and/or hub service. The apparatus 800 may enable the peripherals 952a-952n, which may be simple devices, to operate using camera/computer vision added by connecting to the apparatus 800. For example, integrated pet electronics (e.g., relatively simple devices) with the IoT camera 802 may be a popular product category. The IoT Camera 802 with a peripheral port 810 at the power adapter 804 may enable the devices of the system 950 to exchange data and enhance the functionality of each device (e.g., the smart camera 802 may benefit from additional sensors that may not be included with the smart camera 802 and the peripheral devices 952 may benefit from camera functionality and/or an internet connection).

The power adapter 804 may enable control/data signals from an IoT camera 802 to the power adapter 804 and provide a peripheral port 810 at the power adapter 804. The peripheral port 810 may provide controlled AC power and/or controlled DC power, as well as control signals and data in both directions (e.g., to/from the peripheral devices 952a-952n). In one example, the connection may be wired and/or wireless (e.g., Bluetooth, Smart Plugs for Wi-Fi controlled AC power, USB connectors, UART, RF and/or ZigBee).

Implementing the apparatus 800 may enable a standard low cost peripheral device to be controlled by the IoT camera 802. The peripheral devices 952a-952n may efficiently share information with the smart camera 802 to provide fully featured home security and monitoring. The extra cost to add a peripheral port 810 may be low. The benefit to the functionality of the peripherals 952a-952n may be to add the functionality of a relatively expensive smart camera that may be connected to the internet. For example for some peripherals, such as the siren 952a, adding an integrated smart camera functionality may result in a product that is too bulky to use as a home security camera.

Connecting the apparatus 800 to the peripheral devices 952a-952n may enable hardware and/or software to be re-used instead of being implemented multiple times for each device. For example, instead of providing a smart camera with a button and/or chime support, the button and/or chime support may be may be implemented by a separate device (e.g., one of the peripherals 952a-952n).

The smart camera 802 may be configured to connect to the cloud server 954 for at least video upload (e.g., storage) and/or analytics (e.g., object detection). The power adapter 804 may receive power from the household supply 956 and provides power to the smart camera 802. One or more of the peripherals 952a-952n may connect to the power adapter 804 in order to communicate with the smart camera 802. The peripherals 952a-952n may be powered separately (e.g., battery powered or connected to a separate outlet) and/or receive controlled/smart power from the power adapter 804 (e.g., generated by the power converter 992).

Figure 18:
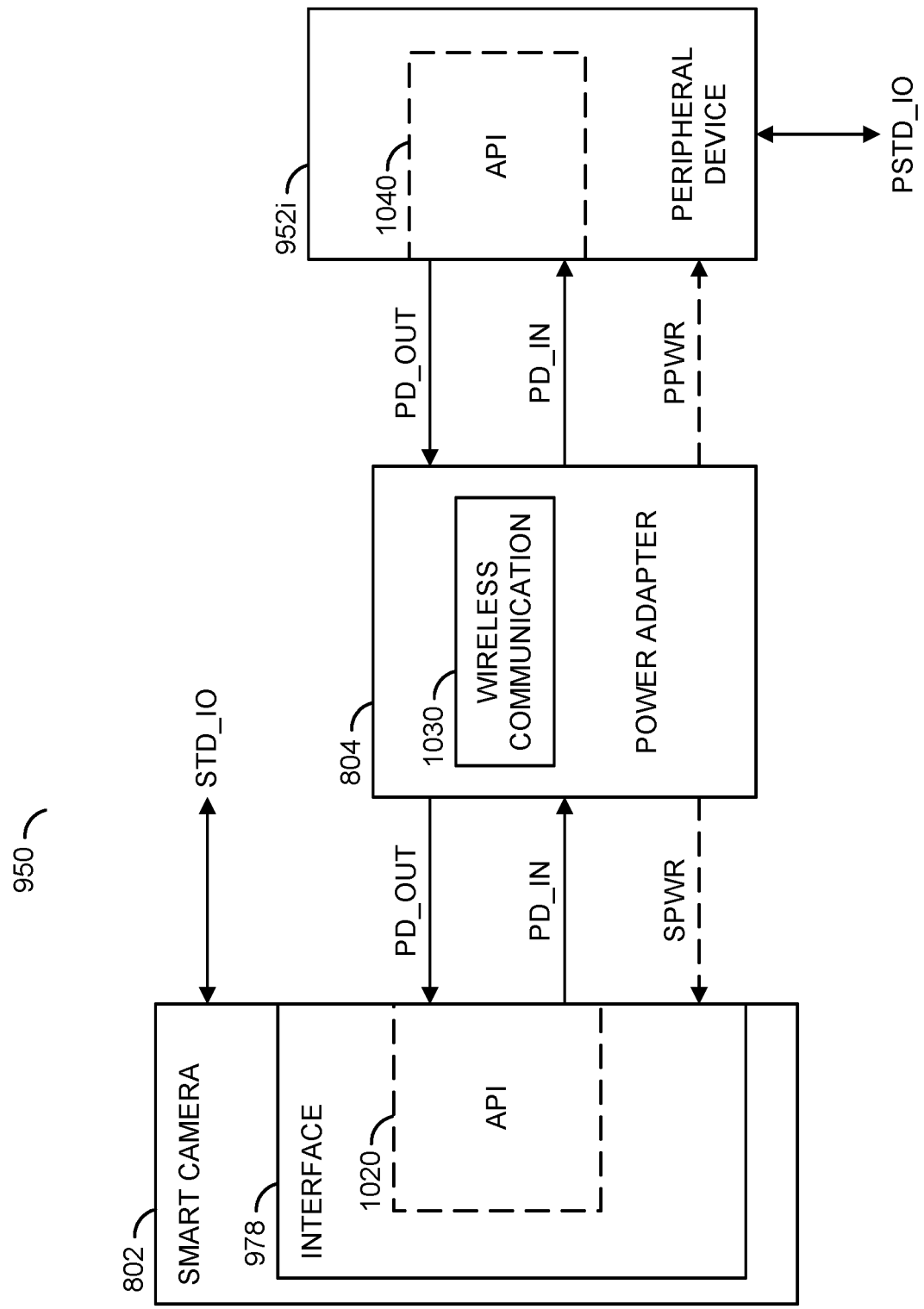
FIG. 18 is a block diagram illustrating data communication between a smart camera and a peripheral device.

Referring to FIG. 18, a block diagram illustrating data communication between a smart camera and a peripheral device is shown. The system 950 is shown as an illustrative example comprising the smart camera 802, the power adapter 804 and one of the peripheral devices 952i. While only one of the peripheral devices 952i is shown, embodiments of the invention may be implemented with any number of the peripheral devices 952a-952n.

The smart camera 802 is shown communicating a signal (e.g., STD_IO), receiving a signal (e.g., PD_OUT), transmitting a signal (e.g., PD_IN) and receiving a signal (e.g., SPWR). The signal STD_IO may be a standard input/output signal. The signal PD_OUT may be an output generated by one or more of the peripheral devices 952a-952n. The signal PD_IN may be an input for one or more of the peripheral devices 952a-952n. The signal SPWR may be a power input to the smart camera 802. The smart camera 802 may generate and/or receive other signals (not shown). The number type and/or format of signals generated and/or received by the smart camera 802 may be varied according to the design criteria of a particular implementation.

The power adapter 804 is shown receiving and transmitting the signal PD OUT, receiving and transmitting the signal PD IN, generating the signal SPWR and/or generating a signal (e.g., PPWR). The power adapter 804 may receive the signal PD OUT from one or more of the peripheral devices 952a-952n and transmit (e.g., forward) the signal PD OUT to the smart camera 802. The power adapter 804 may receive the signal PD IN from the smart camera 802 and transmit (e.g., forward) the signal PD IN to one or more of the peripheral devices 952a-952n. The power adapter 804 may generate the signal SPWR and transmit the signal SPWR to the smart camera 802. The power adapter 804 may generate the signal PPWR and the signal PPWR may be a power input to one or more of the peripheral devices 952a-952n. The number, type and/or format of signals generated and/or received by the power adapter 804 may be varied according to the design criteria of a particular implementation.

The peripheral device 952i may generate the signal PD OUT, receive the signal PD_IN, receive the signal PPWR and communicate a signal (e.g., PSTD_IO). The peripheral device 952i may generate the signal PD OUT and communicate the signal PD_OUT to the power adapter 804. The peripheral device 952i may receive the signal PD_IN from the power adapter 804. The peripheral device 952i may receive the signal PPWR from the power adapter 804. The signal PSTD_IO may be a standard input/output signal for the peripheral device 952i. The number, type and/or format of signals generated and/or receive by the peripheral device 952i may be varied according to the design criteria of a particular implementation.

The interface 978 of the smart camera 802 is shown implementing an application programming interface (API). The API 1020 may be implemented in hardware and/or software. The API 1020 may enable the smart camera 802 to communicate with the peripheral devices 952a-952n via the power adapter 804. The API 1020 may be configured to read information that is received in a pre-determined format. The API 1020 may be configured to packetize data in the pre-determined format to enable the data to be read by one or more of the peripheral devices 952a-952n. The pre-determined format may be a data format that enables data interoperability between various devices. The API 1020 may be implemented to format data and/or control signals. The API 1020 may be configured to ensure that data and/or control signals are formatted to enable the smart camera 802 to understand the signals from one or more of the peripheral devices 952a-952n.

The signal STD_IO may communicate input/output data to/from the smart camera 802. For example, the signal STD_IO may be the data communicated by the smart camera 802 when then smart camera 802 is operating independently (e.g., without connection to the peripheral devices 952a-952n). In an example, the signal STD_IO may communicate with the internet and/or cloud services 954. For example, the signal STD_IO may be used to upload video data to the internet and/or cloud services 954 to enable the processing power of the cloud services to perform computer vision operations. The signal STD_IO may receive the results of the computer vision operations from the internet and/or cloud services 954. In response to the signal STD_IO, the smart camera 802 may perform one or more operations.

The smart camera 802 may generate and/or receive the signal STD_IO both when operating independently and when connected to the peripheral devices 952a-952n. For example, data from the peripheral devices 952a-952n may be treated as another source of input data that may be used by the smart camera 802 (and/or forwarded to the Internet and/or cloud services 954).

The power adapter 804 may be configured to provide power (e.g., AC and/or DC) to the smart camera 802. The signal SPWR may provide the power (e.g., from the power supply 956) to the smart camera 802. The power adapter 804 may be connected to the interface 978.

The power adapter 804 may be configured to send the peripheral data PD_IN from the smart camera 802 to the peripheral device 952i. For example, the smart camera 802 may be configured to detect objects in the captured video frames and present control signals to one or more of the peripheral devices 952a-952n (e.g., detect a burglar and send a control signal to the peripheral device 952a to sound an alarm). In some embodiments, the smart camera 802 may upload video data to the internet and/or cloud services 954 (e.g., the signal STD_IO), the internet and/or cloud services 954 may perform object detection on the video data and provide the smart camera 802 with the results (e.g., the signal STD_IO comprising a result of a burglar detected), the processor 970 may determine an appropriate response to the burglar being detected (e.g., sounding an alarm), and generate an output to the appropriate one of the peripheral devices 952a-952n (e.g., generate an output for the alarm peripheral device 952a). The API 1020 may packetize the output in an appropriate format (e.g., to enable the peripheral device 952a to sound the alarm, how long to sound the alarm for, which type of sound to make etc.). The API 1020 may generate the packetized data as the signal PD_IN.

The power adapter 804 may be configured to forward the information from the smart camera 802 to the peripheral devices 952a-952n and/or forward the information from the peripheral devices 952a-952n. In an example, the predetermined format may comprise a device ID to indicate which of the peripheral devices 952a-952n connected to the power adapter 804 to send the data to. Similarly, the predetermined format may comprise a device ID to indicate which smart camera 802 (e.g., in embodiments where more than one smart camera is implemented) to send the data from the peripheral devices 952a-952n to.

The power adapter 804 is shown comprising a block (or circuit) 1030. The circuit 1030 may implement a wireless communication module. The wireless communication module 1030 may enable the smart camera 802 and/or the peripheral devices 952a-952n to communicate wirelessly via the power adapter 804. For example, one or more of the peripheral devices 952a-952n may comprise an independent power source (e.g., a connection to the power supply 956, which would make receiving power from the power adapter 804 redundant). If the peripheral device 952i does not need to receive power from the power adapter 804, then the signals PD_OUT and/or PD_IN may be communicated wirelessly.

The peripheral device 952i is shown communicating the signal PSTD_IO. The signal PSTD_IO may be standard input/output generated by and/or received by the peripheral device 952i. The signal PSTD_IO may enable the peripheral device 952i to communicate for the independent functionality of the peripheral device 952i (e.g., for operation without connection to the apparatus 800). In an example, when the peripheral device 952i is an audio detector connected to a light, the signal PTSD_IO may be incoming audio detected by the peripheral device 952i and the signal PTSD_IO may be an output to activate a light bulb in response to the detected audio. The peripheral device 952i may generate and/or receive the signal PTSD_IO both when connected to the apparatus 800 (e.g., not acting independently) and when not connected to the apparatus 800 (e.g., acting independently).

The peripheral device 952i may be configured to receive power from the power adapter 804. The signal PPWR may provide the power (e.g., DC power converted from the AC power from the power supply 956) to one or more of the peripheral devices 952a-952n. The power adapter 804 may be connected to the interface 978.

The peripheral device 952i is shown comprising an API 1040. In an example, the API 1040 may be implemented by the SoC 1000i. Similar to the API 1020 implemented by the smart camera 802, the API 1040 may be configured to ensure that data and/or control signals generated are formatted to enable the smart camera 802 to understand the signal(s) from the peripheral device 952i. The API 1040 may be able to convert the information from the smart camera 802 into instructions that may be executed by the peripheral device 952i. In some embodiments, the API 1040 may be implemented by the peripheral devices 952a-952n by a firmware update. In some embodiments, the API 1040 may be configured to receive an on/off signal (e.g., the signal PD_IN may indicate whether to power on or power off the peripheral device 952i) and/or an actuator signal (e.g., the signal PD_IN may be a PWM signal to indicate how long to operate).

In some embodiments, the power adapter 804 may be configured to send the peripheral data (e.g., the signal PD_OUT) from the peripheral device 952i to the smart camera 802. For example, if the peripheral device 952i is a pet food dispenser, the pet food dispenser 952i may have a motion detector to detect the presence of a pet eating food (e.g., a PIR detector). In response to detecting the presence of a pet, the pet food dispenser 952i may generate the signal PD_OUT. The signal PD_OUT may be a control signal configured to activate the smart camera 802 (e.g., wake up from a sleep mode). The signal PD_OUT may be communicated to the power adapter 804 and the power adapter 804 may forward the signal PD_OUT to the API 1020. The API 1020 may format the peripheral data to a format readable by the processor 970. The processor 970 may interpret the peripheral data (e.g., how long has a presence been detected, the size of the presence detected, etc.). If the processor 970 determines that the information indicates that the pet is present, the processor 970 may activate the capture device 974 to begin recording the pet. The communication device 976 may upload the recorded video to the cloud service 954.

Figure 19:
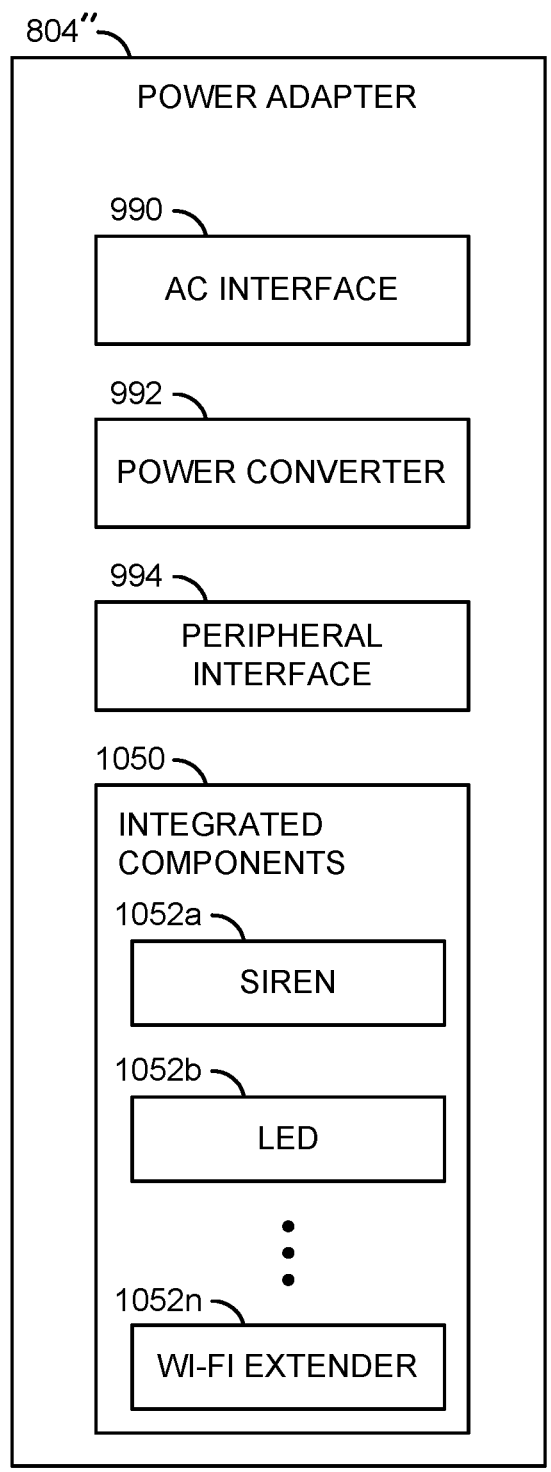
FIG. 19 is a diagram illustrating a power adapter comprising integrated components.

Referring to FIG. 19, a diagram illustrating the power adapter 804" comprising integrated components is shown. In some embodiments, the power adapter 804" may further comprise integrated components. Integrating various components with the power adapter 804" may enable the apparatus 800 to have some of the functionality of the peripheral devices 952a-952n without connecting to the peripheral devices 952a-952n. The power adapter 804" may be configured to convert the AC power to the DC supply and provide the DC supply to the integrated components.

The power adapter 804" may comprise the AC interface 990, the power converter 992, the peripheral interface 994 and/or a block (or circuit) 1050. The circuit 1050 may implement an integrated components block. The integrated components 1050 may comprise a blocks (or circuits) 1052a-1052n. In an example, the integrated component 1052a may implement a siren/alarm, the integrated component 1052b may implement an LED and the integrated component 1052n may implement a Wi-Fi extender/repeater. In another example, one of the integrated components 1052a-1052n may implement a chime. The types of components that may be integrated with the power adapter 804" may be varied according to the design criteria of a particular implementation.

In some embodiments, the integrated components 1052a-1052n may be removable and/or replaceable. For example, the integrated components block 1050 may comprise a number of sockets and/or connectors to enable the various integrated components 1052a-1052n to directly connect to the power adapter 804". The integrated components 1052a-1052n may have similar functionality to the peripheral devices 952a-952n (e.g., enable additional functionality for the smart camera 802).

In some embodiments, the integrated components 1052a-1052n may respond to the signals PD_IN generated by the smart camera 802. For example, a web app may enable a user to adjust settings. The cloud service 954 may update the settings and communicate the update to the smart camera 802. The smart camera 802 may generate the signal PD_IN to update the operating conditions of the integrated peripherals 1052a-1052n (or the peripherals 952a-952n). In an example, a volume level of the siren 1052a may be adjusted. In another example, a light intensity and or timing for the LED 1052b may be adjusted (e.g., to operate as a night light at 50 lumen to a bright security light at 1000 lumen).

Figure 20:
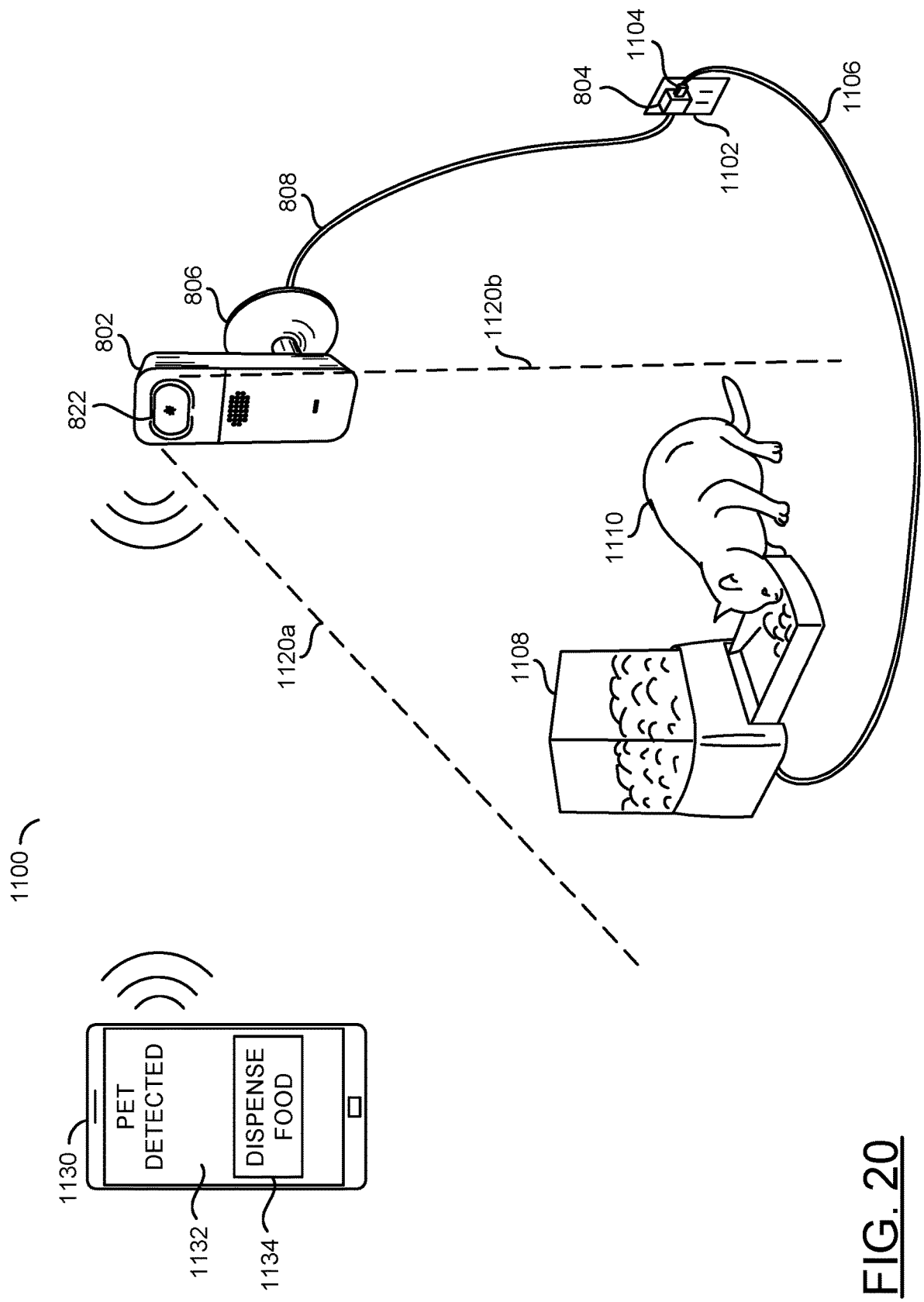
FIG. 20 is a diagram illustrating an example implementation of adding a camera and internet-connectivity to a pet food dispenser.

Referring to FIG. 20, a diagram illustrating an example implementation of adding a camera and internet-connectivity to a pet food dispenser is shown. A system 1100 is shown comprising the smart camera 802, the power adapter 804, the mount 806, the cable 808 and the lens 822. In the example system 1100, the smart camera 802 may be mounted to a wall using the mount 806. The smart camera 802 may be connected to the power adapter 804 via the wire 808.

The power adapter 804 may be plugged into the wall outlet 1102. The wall outlet 1102 may be a receptacle for the power supply 956. For example, the power adapter 804 may be plugged into the wall outlet 1102 (e.g., using the prongs 812) to receive the AC power from the power supply 956. The power adapter 804 may provide the AC power to the smart camera 802 using the cable 808.

A peripheral plug 1104 is shown connected to the power adapter 804. In an example, the peripheral plug 1104 may be a USB male plug configured to connect to the peripheral port 810 (e.g., a USB female socket). The peripheral plug 1104 may be at one end of a peripheral cable 1106. The peripheral cable 1106 may connect to a pet food dispenser 1108.

The power converter 992 may be configured to convert the AC power received by plugging the power adapter 804 into the wall outlet 1102 to a DC power supply. By plugging the peripheral plug 1104 into the peripheral port 810, the cable 1106 may communicate the DC power supply to the pet food dispenser 1108. The pet food dispenser 1108 may operate using the DC power supply generated by the power adapter 804.

The pet food dispenser 1108 may be one of the peripheral devices 952a-952n. In an example, the pet food dispenser 1108 (e.g., the peripheral device 952c) may implement the SoC 1000c to implement a basic timer to dispense food at pre-determined intervals to feed a pet (e.g., a cat 1110). The pet food dispenser 1108 may operate independently as a time-based device (e.g., a dumb timer) to feed the cat 1110 (e.g., dispense food every few hours). For example, when operating independently, the pet food dispenser 1108 may not have a capability of detecting when the cat 1110 is present and/or may not record video of the cat 1110.

Lines 1120a-1120b are shown. The lines 1120a-1120b may represent a field of view of the lens 822. The smart camera 802 may record video data within the field of view 1120a-1120n. In some embodiments, the smart camera 802 (e.g., using the processor 970) may perform local video analysis to detect objects within the field of view 1120a-1120b. In some embodiments, the processor 970 may generate video data of the field of view 1120a-1120b and the communications devices 976 may upload the video data to the internet and/or cloud services 954 to perform the video analysis and the results of the video analysis may be transmitted to the smart camera 802. In the example system 1100, the smart camera 802 may be configured to record video so that the cat 1110 may be detected.

By connecting the pet food dispenser 1108 to the power adapter 804 via the cable 1106, the pet food dispenser 1108 may be able to benefit from the features and/or functionality of the smart camera 802. In one example, in response to detecting the cat 1110 in the captured video, the processor 970 may generate instructions for the pet food dispenser 1108. The API 1020 may packetize the instructions in a format that may be readable by the pet food dispenser 1108. The interface 978 may communicate the signal PD_IN to the power adapter 804 via the cable 808. For example, the cable 808 may communicate power to the smart camera 802 and communicate the signal PD_IN to the power adapter 804. The power adapter 804 may forward the signal PD_IN to the pet food dispenser 1108 via the peripheral cable 1106. For example, the peripheral cable 1106 may transmit the power (e.g., the signal PPWR) and the signal PD_IN to the pet food dispenser 1108. The API 1040 may read the signal PD_IN and convert the instructions to a format usable by the SoC 1000c. The SoC 1000c may be configured to cause the pet food dispenser 1108 to respond to the instructions in the signal PD_IN. For example, the pet food dispenser 1108 may dispense additional food in response to the cat 1110 being detected in the video of the smart camera 802. Without the video analysis capability of the smart camera 802, the pet food dispenser 1108 may not have the functionality of detecting the cat 1110 and dispensing food in response to detecting the cat 1110 (e.g., unless the pet food dispenser 1108 had a built-in camera, which would increase costs).

By connecting the pet food dispenser 1108 to the power adapter 804 via the cable 1106, the smart camera 802 may be able to benefit from the features and/or functionality of the pet food dispenser 1108. In one example, the pet food dispenser 1108 may comprise a motion sensor to detect the presence of the cat 1110. The SoC 1000c may generate data for the smart camera 802 and the API 1040 may packetize the data in a format readable by the smart camera 802. The API 1040 may communicate the packetized data as the signal PD_OUT to the power adapter 804 via the peripheral cable 1106. For example, the peripheral cable 1106 may communicate the signal PPWR to provide power from the power adapter 804 to the pet food dispenser 1108, and communicate the signal PD_OUT to the power adapter 804 from the pet food dispenser 1108. The power adapter 804 may forward the signal PD_OUT to the smart camera 802. For example, the cable 808 may communicate the power signal SPWR and the data/control signal PD_OUT from the power adapter 804 to the smart camera 802. The interface 978 may receive the signal PD_OUT and the API 1020 may translate the signal PD_OUT to extract the data from the pet food dispenser 1108. The processor 970 may read and/or interpret the data from the signal PD_OUT. In an example, the data may indicate that motion was detected (e.g., potentially the cat 1110) and in response to the detected motion, the smart camera 802 may initiate recording of the field of view 1120a-1120n. For example, instead of continually recording, by using the additional functionality of the motion sensor of the pet food dispenser 1108, the smart camera 802 may conserve power and/or storage space by selectively recording only when motion is detected. Without the motion detection capability of the pet food dispenser 1108, the smart camera 802 may not have the functionality of detecting motion (e.g., unless the smart camera 802 had a built-in motion sensor).

The example system 1100 may comprise a computing device 1130. In the example shown, the computing device 1130 may be a smartphone. However, the computing device 1130 may be implemented as a desktop computer, a laptop computer, a tablet computing device, etc. (e.g., any device with a display, wireless connectivity and capable of installing and/or executing programs/apps). In some embodiments, the communications device 976 of the smart camera 802 may wirelessly connect to the smartphone 1130. For example, the smartphone 1130 may provide the connection to the internet and/or cloud services 954 and the smart camera 802 may access the internet and/or cloud services 954 through the smartphone 1130. In some embodiments, the communications device 976 may access the internet and/or cloud services 954 and then connect to the smartphone 1130.

The smartphone 1130 is shown implementing an app 1132. The app 1132 may be configured to provide feedback to a user from the smart camera 802 and/or enable the user to provide input to the smart camera 802. When the apparatus 800 is connected to one of the peripherals 952a-952n, the functionality of the app 1132 may be extended to provide feedback to the user from the peripheral devices 952a-952n (e.g., via the apparatus 800) and/or enable the user to provide input to the peripheral devices 952a-952n (e.g., via the apparatus 800). For example, the app 1132 may be configured as a single-app solution for controlling and/or receiving information about a smart home system comprising the apparatus 800 and any connected peripherals 952a-952n. For example, the app 1134 may provide a unified interface and/or data input/output system instead of implementing one app for each of the peripherals 952a-952n.

In the example shown a button 1134 is displayed on the app 1132. The button 1134 may enable the user to provide input to the apparatus 800. In one example, the button 1134 may enable the user to provide instructions to the pet dispenser 1108 to dispense more food. In an example, the results of the video analysis performed in response to the video captured by the smart camera 802 may be presented to the app 1132 (e.g., to indicate that the cat 1110 has been detected). The user may decide whether to dispense food for the cat 1110. If the user presses the button 1134 to dispense more food, the smartphone 1130 may provide instructions (e.g., wirelessly) to the smart camera 802. The processor 970 may interpret the instructions, and generate instructions for the pet food dispenser 1108. The API 1020 may packetize the instructions to communicate the signal PD_IN to the pet food dispenser 1108. The pet food dispenser 1108 may dispense more food in response to the signal PD_IN. Without the connection to the apparatus 800, the pet food dispenser 1108 may not have the internet connectivity to allow the user to remotely dispense food for the cat 1110.

In another example, in response to receiving the signal PD_OUT of the motion data from the pet food dispenser 1108, the processor 970 may generate output to display on the app 1132. For example, the smart camera 802 may record video of the cat 1110 eating from the pet food dispenser 1108. The smart camera 802 may upload the video data to the internet and/or cloud services 954. The app 1132 may be configured to access the internet and/or cloud services 954 to stream and/or download the video data uploaded by the smart camera 802 to the internet and/or cloud services 954. The user may use the app 1132 to view the cat 1110 eating from the pet food dispenser 1108. Many pet owners enjoy being able to remotely watch pets eat or play. Without the connection to the apparatus 800, the pet food dispenser 1108 may not enable video streaming. Similarly, without receiving the motion detection information from the pet food dispenser 1108, the smart camera 802 may not be able to receive an input to initiate streaming to the app 1132.

The functions performed by the diagrams of FIGS. 1-20 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a custom mounting bracket comprising (i) a first piece configured to be secured to an electrical junction box of a wall and (ii) a second piece comprising two threaded pins;
an adapter plate comprising
(i) an interface configured to (a) enable a first side of said adapter plate to be mounted to said custom mounting bracket, (b) connect to an AC power supply from said electrical junction box and (c) enable a light fixture to be mounted to said threaded pins and a second side of said adapter plate and
(ii) a power adapter configured to (a) receive said AC power supply, (b) provide said AC power supply to said light fixture and (c) convert said AC power supply to a DC power source; and
a base comprising a circuit configured to (i) receive said DC power source from said power adapter and (b) capture video data, wherein said base is configured to slide in and out of said adapter plate to adjust a distance between said adapter plate and said base.

2. The apparatus according to claim 1, wherein said threaded pins are configured to connect to mounting holes of said interface.

3. The apparatus according to claim 2, wherein ends of said threaded pins are rounded to facilitate insertion of said threaded pins into said mounting holes.

4. The apparatus according to claim 2, wherein said second piece is configured to rotate with respect to said first piece to enable (i) said first piece to align with said electrical junction box and (ii) said threaded pins to align with said mounting holes.

5. The apparatus according to claim 4, wherein (i) said second piece comprises a first bubble level and second bubble level, (ii) said first bubble level is configured to indicate when said threaded pins are aligned with a first two of said mounting holes in a first orientation of said second piece and (iii) said second bubble level is configured to indicate when said threaded pins are aligned with a second two of said mounting holes in a second orientation of said second piece.

6. The apparatus according to claim 2, wherein (i) a mounting bracket of said light fixture is configured to attach to said threaded pins when said threaded pins are connected to said mounting holes of said interface and (ii) connecting said mounting bracket of said light fixture to said threaded pins enables said light fixture to be mounted to said second side of said adapter plate.

7. The apparatus according to claim 1, wherein (i) said first piece comprises slots configured to (a) align with junction box screw holes of said electrical junction box and (b) enable screws to be inserted through said slots and into said junction box screw holes and (ii) said screws secure said custom mounting bracket to said electrical junction box.

8. The apparatus according to claim 7, wherein said slots are wide enough to enable a threaded portion of said screws to pass through said slots and narrow enough to prevent a head of said screws from passing through said slots to secure said first piece against said electrical junction box.

9. The apparatus according to claim 7, wherein said slots enable said custom mounting bracket to be connected to various sizes of said electrical junction box by providing a range of locations to insert said screws to said junction box screw holes.

10. The apparatus according to claim 1, wherein (i) said first piece and said second piece are connected to each other with a center screw and (ii) a circular slot on said second piece and a slider screw enable said first piece and second piece to rotate with respect to each other.

11. The apparatus according to claim 1, wherein said adapter plate is configured to cover said custom mounting bracket when said adapter plate is attached to said wall.

12. The apparatus according to claim 1, wherein mounting hardware for said light fixture connects to said threaded pins instead of said electrical junction box.

13. The apparatus according to claim 1, wherein said circuit is further configured to (a) analyze said video data and (b) generate a signal in response to said analysis of said video data.

14. The apparatus according to claim 1, wherein adjusting said distance enables a camera module connected to said base and configured to capture said video data for said circuit to be moved to a level that is not obstructed by said light fixture.

15. An apparatus comprising:
a custom mounting bracket configured to mechanically connect to an electrical junction box of a vertical wall, wherein said custom mounting bracket comprises (i) a first piece configured to be secured to said electrical junction box and (ii) a second piece comprising two threaded pins;
an adapter plate comprising
  (i) an interface configured to (a) enable a first side of said adapter plate to be mounted to said custom mounting bracket, (b) connect to an AC power supply from said electrical junction box and (c) enable a light fixture to be mounted to a second side of said adapter plate and
  (ii) a power adapter configured to (a) receive said AC power supply, (b) provide said AC power supply to said light fixture and (c) convert said AC power supply to a DC power source; and
a base, separate from said light fixture, comprising
  (i) a circuit configured to (a) receive said DC power source from said power adapter, (b) analyze video data and (c) generate a signal in response to said video data and
  (ii) a camera module configured to (a) capture said video data and (b) tilt to adjust a field of view captured in said video data, wherein (i) said base is configured to slide in and out of said adapter plate to adjust a distance between said adapter plate and said camera module and (ii) adjusting said distance enables said camera module to be moved to a level that is not obstructed by said light fixture when said camera module is pointed away from said vertical wall.

16. The apparatus according to claim 15, wherein said two threaded pins are configured to connect to mounting holes of said interface.

17. The apparatus according to claim 16, wherein said second piece is configured to rotate with respect to said first piece to enable (i) said first piece to align with said electrical junction box and (ii) said threaded pins to align with said mounting holes.

18. The apparatus according to claim 17, wherein (i) said second piece comprises a first bubble level and second bubble level, (ii) said first bubble level is configured to indicate when said threaded pins are aligned with a first two of said mounting holes in a first orientation of said second piece and (iii) said second bubble level is configured to indicate when said threaded pins are aligned with a second two of said mounting holes in a second orientation of said second piece.

19. The apparatus according to claim 16, wherein (i) a mounting bracket of said light fixture is configured to attach to said threaded pins when said threaded pins are connected to said mounting holes of said interface and (ii) connecting said mounting bracket of said light fixture to said threaded pins enables said light fixture to be mounted to said second side of said adapter plate.

20. An apparatus comprising:
a custom mounting bracket comprising (i) a first piece configured to be secured to an electrical junction box of a wall and (ii) a second piece comprising threaded pins, wherein
  (i) said first piece and said second piece are connected to each other with a center screw and
  (ii) a circular slot on said second piece and a slider screw enable said first piece and second piece to rotate with respect to each other; and
an adapter plate comprising
  (i) an interface configured to (a) enable a first side of said adapter plate to be mounted to said custom mounting bracket, (b) connect to an AC power supply from said electrical junction box and (c) enable a light fixture to be mounted to said threaded pins and a second side of said adapter plate and
  (ii) a power adapter configured to (a) receive said AC power supply, (b) provide said AC power supply to said light fixture and (c) convert said AC power supply to a DC power source; and
a base comprising a circuit configured to (i) receive said DC power source from said power adapter and (b) capture video data, wherein said base is configured to slide in and out of said adapter plate to adjust a distance between said adapter plate and said base.

\* \* \* \* \*